US007820220B2

(12) United States Patent
Mihalos et al.

(10) Patent No.: US 7,820,220 B2
(45) Date of Patent: Oct. 26, 2010

(54) PRODUCTION OF BAKED SNACK CHIPS WITH IRREGULAR SHAPE HAVING NOTCHED EDGES

(75) Inventors: Mihaelos Nicholas Mihalos, Palisades Park, NJ (US); Domenico Cassone, Branchburg, NJ (US); Zena E. Forte, Blairstown, NJ (US); Joseph Fierro, Warwick, NY (US); Henry Fernandes, Marietta, GA (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1512 days.

(21) Appl. No.: 11/101,701

(22) Filed: Apr. 8, 2005

(65) Prior Publication Data

US 2006/0228456 A1 Oct. 12, 2006

(51) Int. Cl.
*A21D 13/00* (2006.01)
(52) U.S. Cl. .................. 426/549; 426/496; 426/808
(58) Field of Classification Search ............... None
See application file for complete search history.

(56) References Cited

U.S. PATENT DOCUMENTS

| D20,662 S | 4/1891 | Pearson |
| D22,990 S | 12/1893 | Mackey |
| D23,078 S | 2/1894 | Ivins |
| D28,785 S | 6/1898 | Perky |
| D31,777 S | 10/1899 | Fox |
| 678,749 A | 7/1901 | Moore et al. |
| 1,039,912 A | 10/1912 | Dollings |
| 1,169,023 A | 1/1916 | Embrey |
| 1,975,326 A | 10/1934 | Loose et al. |
| 2,204,045 A | 6/1940 | Meacham |
| 2,505,407 A | 4/1950 | Johnson |
| 2,584,893 A | 2/1952 | Lloyd |
| 2,704,257 A | 3/1955 | Diez de Sollano et al. |
| 2,767,667 A | 10/1956 | Spooner |
| 2,823,625 A | 2/1958 | Oakes |
| 2,859,121 A | 11/1958 | Avera |
| 2,905,559 A | 9/1959 | Anderson et al. |
| 2,998,318 A | 8/1961 | Forkner |

(Continued)

FOREIGN PATENT DOCUMENTS

CA                637258          2/1962

(Continued)

OTHER PUBLICATIONS

U.S. Appl. No. 29/227,291, filed Apr. 8, 2005, Mihalos et al.

(Continued)

*Primary Examiner*—Lien Tran
(74) *Attorney, Agent, or Firm*—Greenblum & Bernstein, P.L.C.

(57) ABSTRACT

Thin, baked fermented chips having an irregular shape and surface bubbles are produced by cutting a fermented, wheat-based compressed dough sheet into a plurality of pieces having different shapes and notches with a single rotary cutter so that the dough pieces form an interlocking pattern and the notches extend around the periphery of each piece. The notches are spaced around the periphery of each piece and facilitate separation of the dough pieces from each other while at least substantially avoiding tearing and breaking of the dough pieces. A plurality of notches of each piece are aligned or contiguous with notches of any adjacent piece in the interlocking pattern.

8 Claims, 8 Drawing Sheets

U.S. PATENT DOCUMENTS

| | | | |
|---|---|---|---|
| 3,027,258 A | 3/1962 | Markakis et al. |
| 3,089,773 A | 5/1963 | Bates et al. |
| 3,131,063 A | 4/1964 | d'Arnaud et al. |
| 3,194,664 A | 7/1965 | Eytinge |
| 3,259,503 A | 7/1966 | Tan et al. |
| 3,276,397 A | 10/1966 | Poppe et al. |
| 3,278,311 A | 10/1966 | Brown et al. |
| 3,332,781 A | 7/1967 | Benson et al. |
| 3,348,950 A | 10/1967 | Weiss |
| 3,369,908 A | 2/1968 | Gonzalez et al. |
| 3,384,495 A | 5/1968 | Potter et al. |
| 3,451,822 A | 6/1969 | Fast et al. |
| 3,493,390 A | 2/1970 | Succo |
| 3,519,432 A | 7/1970 | Succo et al. |
| 3,539,356 A | 11/1970 | Benson et al. |
| 3,545,979 A | 12/1970 | Ghafoori |
| 3,600,193 A | 8/1971 | Glabe |
| 3,615,658 A | 10/1971 | Glabe |
| 3,615,697 A | 10/1971 | Hollenbeck |
| 3,652,294 A | 3/1972 | Marotta et al. |
| 3,666,511 A | 5/1972 | Williams et al. |
| 3,677,769 A | 7/1972 | King |
| 3,690,895 A | 9/1972 | Amadon et al. |
| 3,698,309 A | 10/1972 | Steels |
| 3,698,914 A | 10/1972 | Kortschot et al. |
| 3,698,915 A | 10/1972 | Glasgow |
| 3,753,729 A | 8/1973 | Harms et al. |
| 3,753,735 A | 8/1973 | Gerkens |
| 3,787,588 A | 1/1974 | Turitz |
| 3,796,812 A | 3/1974 | Baensch |
| 3,800,050 A | 3/1974 | Popel |
| 3,821,441 A | 6/1974 | Tomita et al. |
| 3,857,982 A | 12/1974 | Sevenants |
| 3,860,735 A | 1/1975 | Hoshino |
| 3,864,505 A | 2/1975 | Hunter et al. |
| 3,873,748 A | 3/1975 | Schwab et al. |
| 3,886,291 A | 5/1975 | Willard |
| 3,899,602 A | 8/1975 | Rutenberg et al. |
| 3,922,370 A | 11/1975 | Prakash |
| 3,925,567 A | 12/1975 | Abe |
| 3,935,322 A | 1/1976 | Weiss et al. |
| 3,937,848 A | 2/1976 | Campbell et al. |
| 3,946,116 A | 3/1976 | Weaver et al. |
| 3,956,517 A | 5/1976 | Curry et al. |
| 3,977,897 A | 8/1976 | Wurzburg et al. |
| 3,982,032 A | 9/1976 | Koizumi |
| 3,988,875 A | 11/1976 | Fay |
| 3,997,684 A | 12/1976 | Willard |
| 3,998,975 A | 12/1976 | Liepa |
| 4,005,139 A | 1/1977 | Kortschot |
| 4,017,460 A | 4/1977 | Tessler |
| 4,044,166 A | 8/1977 | Koizumi |
| 4,053,650 A | 10/1977 | Chino et al. |
| D247,071 S | 1/1978 | Neidenberg et al. |
| 4,073,958 A | 2/1978 | Abe |
| 4,109,012 A | 8/1978 | Bates et al. |
| 4,109,024 A | 8/1978 | Cremer |
| 4,112,222 A | 9/1978 | Jarowenko |
| 4,122,198 A | 10/1978 | Wisdom et al. |
| 4,126,706 A | 11/1978 | Hilton |
| 4,135,004 A | 1/1979 | Finkel |
| 4,140,801 A | 2/1979 | Hilton et al. |
| 4,163,804 A | 8/1979 | Meyer et al. |
| 4,167,588 A | 9/1979 | Willard |
| 4,170,659 A | 10/1979 | Totino et al. |
| 4,207,355 A | 6/1980 | Chiu et al. |
| 4,208,476 A | 6/1980 | Tsao |
| 4,209,536 A | 6/1980 | Dogliotti |
| 4,229,489 A | 10/1980 | Chiu et al. |
| 4,238,517 A | 12/1980 | Bosley et al. |
| 4,266,920 A | 5/1981 | Hayashi et al. |
| 4,272,554 A | 6/1981 | Schroeder et al. |
| 4,277,510 A | 7/1981 | Wicklund et al. |
| 4,293,582 A | 10/1981 | Hamann et al. |
| 4,308,286 A | 12/1981 | Anstett et al. |
| 4,312,892 A | 1/1982 | Rubio |
| 4,326,455 A | 4/1982 | Rubio |
| 4,348,166 A | 9/1982 | Fowler |
| 4,362,754 A | 12/1982 | Wegner et al. |
| 4,391,836 A | 7/1983 | Chiu |
| 4,409,250 A | 10/1983 | Van Hulle et al. |
| 4,418,088 A | 11/1983 | Cantenot |
| 4,439,459 A | 3/1984 | Swartley |
| 4,446,163 A | 5/1984 | Galle et al. |
| 4,455,321 A | 6/1984 | Glabe |
| 4,499,113 A | 2/1985 | Mochizuki et al. |
| 4,505,942 A | 3/1985 | Ito et al. |
| 4,508,739 A | 4/1985 | Ryan |
| 4,513,018 A | 4/1985 | Rubio |
| 4,517,204 A | 5/1985 | Mottur et al. |
| 4,526,800 A | 7/1985 | Howard |
| 4,528,202 A | 7/1985 | Wang et al. |
| 4,537,786 A | 8/1985 | Bernard |
| 4,555,409 A | 11/1985 | Hart |
| 4,560,569 A | 12/1985 | Ivers |
| 4,567,051 A | 1/1986 | Baker et al. |
| 4,568,557 A | 2/1986 | Becker et al. |
| 4,609,557 A | 9/1986 | Mao et al. |
| 4,613,508 A | 9/1986 | Shishido |
| 4,615,901 A | 10/1986 | Yoshioka et al. |
| 4,623,548 A | 11/1986 | Willard |
| 4,623,550 A | 11/1986 | Willard |
| 4,640,843 A | 2/1987 | Matsuzak et al. |
| 4,645,679 A | 2/1987 | Lee, III et al. |
| 4,650,687 A | 3/1987 | Willard et al. |
| 4,735,811 A | 4/1988 | Skarra et al. |
| 4,749,579 A | 6/1988 | Haydock et al. |
| 4,752,493 A | 6/1988 | Moriki |
| 4,756,916 A | 7/1988 | Dreher et al. |
| 4,756,920 A | 7/1988 | Willard |
| 4,767,633 A | 8/1988 | Fowler |
| 4,769,253 A | 9/1988 | Willard |
| 4,770,891 A | 9/1988 | Willard |
| 4,778,690 A | 10/1988 | Sadel, Jr. et al. |
| 4,781,932 A | 11/1988 | Skarra et al. |
| 4,803,091 A | 2/1989 | Mottur et al. |
| 4,806,377 A | 2/1989 | Ellis et al. |
| 4,834,996 A | 5/1989 | Fazzolare |
| 4,844,919 A | 7/1989 | Szwerc |
| 4,855,151 A | 8/1989 | Fielding |
| 4,859,248 A | 8/1989 | Thaler et al. |
| 4,861,609 A | 8/1989 | Willard et al. |
| 4,863,750 A | 9/1989 | Pawlak et al. |
| 4,869,911 A | 9/1989 | Keller |
| 4,873,093 A | 10/1989 | Fazzolare et al. |
| 4,876,101 A | 10/1989 | Willard |
| 4,876,102 A | 10/1989 | Feeney et al. |
| 4,879,126 A | 11/1989 | Willard et al. |
| 4,880,371 A | 11/1989 | Spinelli et al. |
| 4,889,733 A | 12/1989 | Willard et al. |
| 4,889,737 A | 12/1989 | Willard et al. |
| 4,891,233 A | 1/1990 | Belanger et al. |
| 4,910,031 A | 3/1990 | Budd et al. |
| 4,913,919 A | 4/1990 | Cornwell et al. |
| 4,917,908 A | 4/1990 | Prosise |
| 4,917,909 A | 4/1990 | Prosise |
| 4,919,965 A | 4/1990 | Childers, Jr. |
| 4,929,461 A | 5/1990 | Schonauer et al. |
| 4,931,303 A | 6/1990 | Holm et al. |
| 4,933,194 A | 6/1990 | Barry et al. |
| 4,933,199 A | 6/1990 | Neel et al. |
| 4,938,982 A | 7/1990 | Howard |
| 4,950,490 A | 8/1990 | Ghiasi et al. |
| 4,965,081 A | 10/1990 | Lazarus |

| | | | | | |
|---|---|---|---|---|---|
| 4,970,084 A | 11/1990 | Pirrotta et al. | D498,034 S | 11/2004 | Schwartzberg et al. |
| 4,973,481 A | 11/1990 | Dayley et al. | D504,001 S | 4/2005 | Ferguson et al. |
| 4,976,982 A | 12/1990 | Gillmore et al. | D506,302 S | 6/2005 | Schwartzberg et al. |
| 4,985,262 A | 1/1991 | Camire et al. | D512,198 S | 12/2005 | Schwartzberg et al. |
| 4,994,295 A | 2/1991 | Holm et al. | D513,108 S | 12/2005 | Ferguson et al. |
| 5,000,968 A | 3/1991 | Szwerc et al. | D513,652 S | 1/2006 | Schwartzberg et al. |
| 5,030,468 A | 7/1991 | van Lengerich et al. | D513,653 S | 1/2006 | Schwartzberg et al. |
| 5,061,507 A | 10/1991 | Aulik et al. | D515,776 S | 2/2006 | Schwartzberg et al. |
| D323,233 S | 1/1992 | Duffy | D515,777 S | 2/2006 | Schwartzberg et al. |
| D323,234 S | 1/1992 | Duffy | D515,778 S | 2/2006 | Ferguson et al. |
| D323,235 S | 1/1992 | Duffy | D515,779 S | 2/2006 | Ferguson et al. |
| 5,080,914 A | 1/1992 | Birch et al. | D515,780 S | 2/2006 | Schwartzberg et al. |
| 5,085,884 A | 2/1992 | Young et al. | D516,271 S | 3/2006 | Schwartzberg et al. |
| 5,104,673 A | 4/1992 | Fazzolare | D516,272 S | 3/2006 | Ferguson et al. |
| 5,110,613 A | 5/1992 | Brown et al. | D516,273 S | 3/2006 | Ferguson et al. |
| 5,147,675 A | 9/1992 | Gage et al. | D516,274 S | 3/2006 | Schwartzberg et al. |
| 5,171,600 A | 12/1992 | Young et al. | D516,771 S | 3/2006 | Ferguson et al. |
| 5,188,859 A | 2/1993 | Lodge et al. | D516,772 S | 3/2006 | Ferguson et al. |
| 5,194,284 A | 3/1993 | Chiu et al. | D516,773 S | 3/2006 | Schwartzberg et al. |
| 5,240,731 A | 8/1993 | Bornhorst et al. | D516,774 S | 3/2006 | Ferguson et al. |
| 5,281,432 A | 1/1994 | Zallie et al. | D516,775 S | 3/2006 | Ferguson et al. |
| 5,283,071 A | 2/1994 | Taylor et al. | D517,274 S | 3/2006 | Schwartzberg et al. |
| 5,320,858 A | 6/1994 | Fazzolare et al. | D517,275 S | 3/2006 | Schwartzberg et al. |
| 5,362,505 A | 11/1994 | Hsieh et al. | D517,276 S | 3/2006 | Ferguson et al. |
| 5,362,511 A | 11/1994 | Villagran et al. | D517,277 S | 3/2006 | Ferguson et al. |
| 5,366,748 A | 11/1994 | Villagran et al. | D518,272 S | 4/2006 | Schwartzberg et al. |
| 5,366,749 A | 11/1994 | Frazee et al. | D518,273 S | 4/2006 | Ferguson et al. |
| D353,032 S | 12/1994 | Mistretta | D518,621 S | 4/2006 | Ferguson et al. |
| D356,656 S | 3/1995 | Juranovic et al. | D518,622 S | 4/2006 | Schwartzberg et al. |
| 5,395,637 A | 3/1995 | Reec | D519,713 S | 5/2006 | Ferguson et al. |
| 5,405,625 A | 4/1995 | Biggs | D519,714 S | 5/2006 | Ferguson et al. |
| 5,429,834 A | 7/1995 | Addesso et al. | D520,711 S | 5/2006 | Ferguson et al. |
| 5,433,961 A | 7/1995 | Lanner et al. | 7,210,920 B2 * | 5/2007 | Kolz .................. 425/298 |
| 5,464,642 A | 11/1995 | Villagran et al. | 2002/0018837 A1 | 2/2002 | Lanner et al. |
| 5,464,643 A | 11/1995 | Lodge | 2002/0018838 A1 | 2/2002 | Zimmerman et al. |
| 5,470,599 A | 11/1995 | Ruhe | 2002/0028273 A1 | 3/2002 | Teras et al. |
| 5,500,240 A | 3/1996 | Addesso et al. | 2002/0034571 A1 | 3/2002 | Zimmerman et al. |
| 5,505,978 A | 4/1996 | Roy et al. | 2004/0067282 A1 | 4/2004 | Karwowski et al. |
| 5,529,799 A | 6/1996 | Bornhorst et al. | 2005/0053708 A1 | 3/2005 | Mihalos et al. |
| 5,554,405 A | 9/1996 | Fazzolare et al. | | | |
| 5,571,546 A | 11/1996 | Kristnus et al. | | FOREIGN PATENT DOCUMENTS | |
| 5,576,033 A | 11/1996 | Herrera | CA | 2082602 | 5/1993 |
| 5,643,627 A | 7/1997 | Huang et al. | CA | 2223938 | 3/1997 |
| 5,652,010 A | 7/1997 | Gimmler et al. | CA | 2174824 | 10/1998 |
| D383,886 S | 9/1997 | Baumgartner | CA | 2289489 | 11/1998 |
| 5,690,982 A | 11/1997 | Fazzolare | CA | 2175452 | 1/1999 |
| 5,695,804 A | 12/1997 | Hnat et al. | CA | 2181123 | 1/2000 |
| 5,720,822 A | 2/1998 | Jeffcoat et al. | CA | 2197179 | 4/2001 |
| 5,747,092 A | 5/1998 | Carey et al. | DE | 26 04 716 A1 | 8/1976 |
| 5,902,410 A | 5/1999 | Chiu et al. | DE | 41 37 161 A1 | 5/1993 |
| 5,904,947 A | 5/1999 | Jensen et al. | EP | 0 184 964 A2 | 6/1986 |
| 5,922,386 A | 7/1999 | Reed et al. | EP | 0 482 709 A1 | 4/1992 |
| 5,925,396 A | 7/1999 | Reed et al. | EP | 0 841 012 A1 | 5/1998 |
| 5,928,701 A | 7/1999 | Jensen et al. | FR | 2 267 049 | 11/1975 |
| 5,964,146 A | 10/1999 | Kelly et al. | GB | 107218 | 6/1917 |
| 5,980,967 A | 11/1999 | Carey et al. | GB | 1 525 631 | 9/1978 |
| D417,332 S | 12/1999 | Dawe et al. | GB | 2 111 816 A | 7/1983 |
| 6,001,409 A | 12/1999 | Gimmler et al. | GB | 2 114 416 A | 8/1983 |
| 6,004,612 A | 12/1999 | Andreski et al. | JP | 54-1786 | 1/1979 |
| 6,022,574 A | 2/2000 | Lanner et al. | JP | 54-32056 | 10/1979 |
| 6,033,707 A | 3/2000 | Lanner et al. | JP | 55-108250 | 8/1980 |
| 6,056,990 A | 5/2000 | Delrue et al. | JP | 59-31642 | 2/1984 |
| 6,083,541 A | 7/2000 | Hanstra et al. | JP | 60-168361 | 8/1985 |
| 6,120,827 A | 9/2000 | Rocca | JP | 60-244256 | 12/1985 |
| D445,237 S | 7/2001 | Boselli et al. | JP | 61-202658 | 9/1986 |
| 6,277,423 B1 | 8/2001 | Orosa et al. | SU | 370933 | 11/1973 |
| 6,479,090 B1 | 11/2002 | Carey et al. | WO | WO 95/05742 | 3/1995 |
| 6,491,959 B1 | 12/2002 | Chiang et al. | WO | WO 95/05744 | 3/1995 |
| 6,572,910 B2 | 6/2003 | Lanner et al. | WO | WO 96/01572 | 1/1996 |
| 6,676,983 B2 | 1/2004 | Malfait | WO | WO 97/25880 | 7/1997 |
| D487,951 S | 4/2004 | Barry et al. | WO | WO 99/33357 | 7/1999 |
| D489,162 S | 5/2004 | Dings-Plooij | WO | WO 99/34691 | 7/1999 |
| D490,590 S | 6/2004 | Ferguson et al. | | | |

WO    WO 01/37672 A1    5/2001

OTHER PUBLICATIONS

U.S. Appl. No. 29/217,431, filed Nov. 17, 2004, Ferguson et al.
U.S. Appl. No. 29/229,045, filed May 3, 2005, Ferguson et al.
U.S. Appl. No. 29/230,258, filed May 19, 2005, Ferguson et al.
U.S. Appl. No. 29/230,259, filed May 19, 2005, Ferguson et al.
U.S. Appl. No. 29/230,260, filed May 19, 2005, Ferguson et al.
U.S. Appl. No. 29/230,261, filed May 19, 2005, Ferguson et al.
U.S. Appl. No. 29/230,262, filed May 19, 2005, Ferguson et al.
U.S. Appl. No. 29/230,263, filed May 19, 2005, Ferguson et al.
U.S. Appl. No. 29/230,264, filed May 19, 2005, Ferguson et al.
U.S. Appl. No. 29/230,250, filed May 19, 2005, Ferguson et al.
U.S. Appl. No. 29/230,251, filed May 19, 2005, Ferguson et al.
U.S. Appl. No. 29/230,252, filed May 19, 2005, Ferguson et al.
U.S. Appl. No. 29/230,253, filed May 19, 2005, Ferguson et al.
U.S. Appl. No. 29/230,246, filed May 19, 2005, Ferguson et al.
U.S. Appl. No. 29/230,247, filed May 19, 2005, Ferguson et al.
U.S. Appl. No. 29/230,248, filed May 19, 2005, Ferguson et al.
U.S. Appl. No. 29/216,672, filed Nov. 5, 2004, Schwartzberg et al.
U.S. Appl. No. 29/229,044, filed May 3, 2005, Schwartzberg et al.
U.S. Appl. No. 29/230,239, filed May 19, 2005, Schwartzberg et al.
U.S. Appl. No. 29/230,241, filed May 19, 2005, Schwartzberg et al.
U.S. Appl. No. 29/230,240, filed May 19, 2005, Schwartzberg et al.
U.S. Appl. No. 29/230,242, filed May 19, 2005, Schwartzberg et al.
U.S. Appl. No. 29/230,243, filed May 19, 2005, Schwartzberg et al.
U.S. Appl. No. 29/230,244, filed May 19, 2005, Schwartzberg et al.
U.S. Appl. No. 29/230,245, filed May 19, 2005, Schwartzberg et al.
U.S. Appl. No. 29/230,254, filed May 19, 2005, Schwartzberg et al.
U.S. Appl. No. 29/230,255, filed May 19, 2005, Schwartzberg et al.
U.S. Appl. No. 29/230,256, filed May 19, 2005, Schwartzberg et al.
U.S. Appl. No. 29/230,257, filed May 19, 2005, Schwartzberg et al.
Chemical Abstract #58556d of 17—Foods. vol. 80, 1974.
Tressler, Donald K. Ph.D., *Food Products Formulary*, vol. 2, Cereals, Baked Goods, Dairy and Egg Products, The AVI Publ. Co., Westport, CT., pp. 103-104 (1975).
"Low-Calorie, Baked Snack . . . 'Potato Pips'", *Engineered Foods Magazine*, p. 58 (Aug. 8, 1984).
Pyler, E.J., "Baking Science and Technology", Siebel Publ. Co., Chicago, IL, 1973, pp. 428-429.
Matz, S.A., *Cookie and Cracker Technology*, The AVI Publ. Co., Chapter 18, pp. 238-253 (1968).
Matz, S.A., *Cookie and Cracker Technology*, The AVI Publ. Co., pp. 265-266 (1968).
Pyler, E.J., *Baking Science & Technology*, Sosland Publishing Co., Merriam, KS, 1988, pp. 1061-1062, 913, and 609.
*Foods and Food Preparation Encyclopedia*, Van Nostrand Reinhold Co., Inc., NY, NY, 1982, pp. 282-284.
Desrosier, N.W., *Elements of Food Technology*, AVI Publ. Co., Inc., Westport, Conn., 1977, pp. 479-482 and 468-469.
Cerletti, et al., "Maize Germ Proteins, Their Composition, Nutritive Value and Functional Properties", *Proc. Int. Assoc. Cereal Chem. Symp. Amino Acid Composition and Biological Value of Cereal Proteins*, Budapest, Hungary 1983, R. Lasztity, M. Hidvegi, eds.
Encyclopedia of Food Technology, vol. 2, pp. 262-267, (1974), The AVI Publishing Company, Inc.
Kotschevar, L.H., *Standards, Principals, and Techniques in Quality Food Production*, Van Nostrad Reinhold, NY, NY, 1988, pp. 404-407.
Whistler, et al., *Starch: Chemistry and Technology*, Academic Press, Inc., pp. 588-590 (1984).
"*Methods in Carbohydrate Chemistry*," Academic Press, 1964, vol. IV, pp. 168-169.

Matz, *Cookie and Cracker Technology*, 2nd ed., The AVI Publ. Co., Inc. (1968), pp. 11-12.
Atwell, et al., "The Terminology and Methodology Associated With Basic Starch Phenomena", *Cereal Food World*, vol. 33, No. 3, pp. 306-311 (Mar. 1988).
Molina, et al., "Drum Drying For the Improved Production of Instant Tortilla Flour," *Journal of Food Science*, vol. 42, No. 6 (1977), pp. 1432-1434.
Whistler et al., *Starch: Chemistry & Technology*, Academic Press, Inc., pp. 25, 30, 49-59 (1984).
Specifications for Baker's Bran, 10691, DOC, The Pillsbury Co., Sep. 29, 1999.
Flav-R-Grain® Fine Product Data, Quali Tech, Inc. (Oct. 1995).
Regular #O Yellow Product Data, Azteca Milling Co. (Jan. 1996).
PGF 1000 Pregelatinized Corn Flour, Lauhoff Grain Co. (Jul. 1997).
Whistler et al., Starch Chemistry and Technology . . . , $2^{nd}$ Edition, Academic Press, p. 487, 1984.
Faridi, H., The Science of Cookie and Cracker Production, Chapman Hall, p. 241, 1994.
Pizzarias Pizza Chips, Pizza Supreme, sample of packaging including list of ingredients from trademark U.S. Appl. No. 74/080,043, Jan. 1991 (first use in commerce), Keebler Company, Elmhurst, IL.
Pizzarias Pizza Chips, Zesty Pepperoni, sample of packaging including list of ingredients from trademark U.S. Appl. No. 74/080,043, Jan. 1991 (first use in commerce), Keebler Company, Elmhurst, IL.
Zings Snack Chips, sample of packaging including list of ingredients, May 1991 (first use in commerce), Nabisco, Inc., East Hanover, NJ, from file wrapper of U.S. Appl. No. 74/122,575.
Zings Snack Chips, color reproduction of packaging, including list of ingredients, 1991 (use in commerce), Nabisco, Inc., East Hanover, NJ.
Zings Ranch Cracker Chips, color reproduction of packaging including list of ingredients, 1991 (use in commerce), Nabisco, Inc., East Hanover, NJ.
Zings Cheddar Snack Chips, 1991 (use in commerce), Nabisco, Inc., East Hanover, NJ.
Munch'ems Seasoned Original, sample of packaging, including list of ingredients from trademark U.S. Appl. No. 74/088,762, Jan. 1991 (first use in commerce), Keebler Company, Elmhurst, IL.
Munch'ems Southwest Salsa, sample of packaging including list of ingredients, Keebler Co. 1996 (copyright date).
Munch'ems Crackers, list of ingredients obtained from Keebler Company web site (possible use in commerce 1991).
Munch'ems Sour Cream & Onions Crackers, list of ingredients obtained from Keebler Company web site (possible use in commerce 1991).
Munch'ems Southwest Salsa Crackers, list of ingredients obtained from Keebler Company web site (possible use in commerce 1996).
Munch'ems Ranch Crackers, list of ingredients obtained from Keebler Company web site (possible use in commerce 1996).
Munch'ems Cheddar Crackers, list of ingredients obtained from Keebler Company web site (possible use in commerce 1991).
Munch'ems Reduced Fat Sour Cream and Onion Crackers, list of ingredients obtained from Keebler Company web site (possible use in commerce 1996).
Cheese Nips Reduced Fat Cheddar, sample of packaging, including list of ingredients, Kraft Foods North America.
Big Cheese Nips, sample of packaging, including list of ingredients, Kraft Foods North America.

* cited by examiner

PRODUCTION OF BAKED SNACK CHIPS WITH IRREGULAR SHAPE HAVING NOTCHED EDGES

FIELD OF THE INVENTION

The present invention relates to the production of fermented, thin, baked snacks having an irregular shape, notched edges, a chip-like crispy texture and surface bubbles. The present invention also relates to an apparatus for producing the snacks.

BACKGROUND OF THE INVENTION

In the production of baked snacks from a dough, such as a wheat-based dough, generally the thinner the dough the more chip-like is the baked snack in crispness and appearance. Also, the more irregular the shape of the snack, and the greater the variety of shapes, the greater is the impression of a chip-like appearance rather than a cracker appearance. Cohesive, machinable doughs which can be sheeted, stretched, and cut into pieces may be produced at room temperature when the doughs possess a high content of wheat or other gluten-containing flour. The baking of conventional wheat-based doughs into crackers provides a lamellar structure with generally uniform small cells and a tender, mealy, leavened texture. Upon mastication, the conventional crackers generally disperse more rapidly than does a chip. They do not provide a crunchy texture and a sensation of breaking into pieces with low molar compaction before dispersion as does a chip. Additionally, crackers are generally dockered to prevent pillowing and to provide a generally flat bottom surface and a blistered top surface. Oyster or soup crackers and snack crackers which have a pillowed appearance may be produced from wheat-based doughs by the elimination of dockering holes. However, these products still possess a leavened, tender, mealy texture and a cracker appearance, rather than a crisp, crunchy chip-like texture and chip-like appearance.

Filled baked crackers or snacks obtained by needle injection of fillings into hollow expanded snacks made from wheat flour are disclosed in U.S. Pat. No. 4,209,536 to Dogliotti, U.S. Pat. No. 4,613,508 to Shishido, U.S. Pat. No. 4,752,493 to Moriki, and U.S. Pat. No. 5,000,968 to Szwerc et al. Production of a chip-like snack having surface bubbles and surrounding crisp, thin regions is not disclosed in these patents. The doughs are formulated and processed to retain a puffed or pillowed shape after piercing of the baked, hollow piece.

A cellular structure is obtained by the use of egg white in the shell of the pastry product of U.S. Pat. No. 4,209,536 to Dogliotti.

In the process of U.S. Pat. No. 4,613,508 to Shishido, hard dough biscuits are prepared by baking a dough having 10-30 parts by weight of sugar, 10-25 parts by weight of edible fat or oil, 1.5-4.0% leavening agent, and 20-35 parts by weight of water per 100 parts by weight of cereal flour to obtain a degree of leavening of at least 280%.

The baked hollow expanded snacks in the form of a figure such as an animal or vehicle of U.S. Pat. No. 4,752,493 to Moriki are produced from a farinaceous raw mixture. The raw mixture is prepared by mixing from 60-95 parts by weight of at least one low swelling-capacity farinaceous material and 40-5 parts by weight of at least one high swelling-capacity farinaceous material. The low swelling-capacity material may be a non-glutinous cereal such as wheat, rye, maize, non-glutinous rice, sago, sorghum, triticale, millet and beans, or starches separated from these sources. The high swelling-capacity material may be potato, taro, tapioca, arrowroot, sweet potato, glutinous rice, waxy corn, or starches derived from these sources having their cell walls broken. The farinaceous raw mixture is partly gelatinized prior to rolling into a smooth sheet by the addition of hot water or by the action of steam, so as to raise the temperature of the farinaceous raw mixture to 65° C. to 90° C. According to Moriki, upon baking, the starch in the surface of the dough pieces is gelatinized, thereby forming a skin having good gas-holding capacity and excellent stretchability. Water and volatile materials in the dough pieces push the skin outward upon heating, so that the dough pieces expand and are internally split into two layers or shells, forming a hollow space therebetween.

The filled crackers of U.S. Pat. No. 5,000,968 to Szwerc et al. are produced from a dough containing proteolytic enzymes. The enzymes hydrolyze proteins of the flour, which relaxes the dough and thereby permits a hollow center to be formed, rather than a cellular center, as the cracker expands under the influence of the leavening agent during baking. This, it is disclosed, strengthens the shell of the cracker and permits the cracker to be filled by means of an injection needle piercing the surface of the cracker.

The production of chip-like, starch-based snacks having a crispy texture and surface blisters from starch-based compositions which have little or no gluten, such as potato flour or corn flour, is disclosed in U.S. Pat. Nos. 4,873,093 and 4,834,996 to Fazzolare et al. and U.S. Pat. Nos. 5,429,834 and 5,500,240 to Addesso et al. Starch-based compositions which have little or no gluten, when mixed with water, do not form a dough that is cohesive at room temperature and continuously machinable or sheetable. Machinability of doughs made from ingredients having little or no gluten may be improved by forming a dough under elevated temperature conditions, such as by steaming the ingredients, as disclosed in U.S. Pat. Nos. 4,873,093 and 4,834,996 to Fazzolare et al.

In the process of U.S. Pat. Nos. 5,429,834 and 5,500,240 to Addesso et al., use of a pregelatinized waxy starch provides for the production of cohesive, extensible, continuously machinable doughs from starchy materials or ingredients having starch with no or low gluten. These machinable doughs may be formed at room temperatures without the need for steaming or heat treatment to develop cohesiveness, extensibility, and machinability.

U.S. Pat. Nos. 4,931,303 and 4,994,295 to Holm et al. disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch), and the concentration of any starch-complexing emulsifiers present. In the Holm et al. process, a dough may be formed comprising, e.g., potato solids or corn solids, raw or pregelatinized starches, modified starches, flavorings, oils, and the like. For producing potato snacks, the preferred major ingredient in the potato dough is a dehydrated potato flake with high water-absorption capability. The dry ingredients are placed in a mixer and blended with water to obtain a dough having a moisture content of from about 30% to about 55%. According to Holm et al., higher moisture content means higher oil absorption during frying. It is further disclosed that doughs containing less than about 30% moisture are generally too dry, after the Holm et al. drying step, to create adequate bubbles. In the Holm et al. process, substantial moisture reduction of the dough is achieved by frying. During frying, the dough moisture content of about 30% to about 55% is reduced to obtain a fried product with a moisture content of about 1-2%.

U.S. Pat. No. 4,560,569 to Ivers discloses that in the production of a dough-based fried food product, a processed starch in either gelatinized or ungelatinized form is frequently added when a low-starch flour or flake is employed. Water, it is disclosed, is required to soften the flour, and depending upon the protein content of the flour, to form a network of protein (gluten), which is the framework of the product. According to Ivers, starch, which is present in flours, is used as a binder and is required for the unleavened product to expand upon frying. Dough stickiness and hardness of the cooked product may be controlled by the addition of oil to the dough to control the extent of the protein framework. The dough is prepared by adjusting the ratios of components and the mixing time to allow it to sheet uniformly at the desired thickness without sticking or tearing. According to Ivers, addition of a small amount of a lecithin-in-water suspension to the formulation of the dough-based fried snack foods improves the transfer, sheeting and cutting, and significantly reduces clumping during frying, without the rapid buildup of free fatty acids and without significant darkening of frying oil, normally associated with the frying of foods containing lecithin.

U.S. Pat. Nos. 5,747,092 and 5,980,967 each to Carey et al. disclose that in the production of wheat-based baked snacks the inclusion of a pregelatinized starch in the dough to create surface bubbles tends to result in a styrofoam-like or compressible texture, rather than a highly crisp, crunchy texture. Also, if the pregelatinized starch is not sufficiently hydrated prior to baking, bubbles created during baking tend to collapse. A pregelatinized potato starch, which is also activated (i.e. sufficiently hydrated) prior to baking, is employed to reduce or control bubbling and to avoid a styrofoam-like texture. Sufficient hydration of the pregelatinized waxy starch and pregelatinized potato starch is achieved by premixing them with hot water or by providing sufficient dough lay time for hydration to occur. The Carey et al. patents disclose forming a dough-like composition into a sheet, and compressing the dough sheet to reduce its thickness. The dough sheet may first be reduced in thickness to about ½ inch and then to about ¼ inch. The reductions in thickness may be performed by the use of one or more sets of counterrotating reduction rolls. In either case, a final reduction in thickness is done by a gauge roller. The dough may be reduced during this operation to a final thickness of about 1/32 of an inch. The dough sheet may then be cut to a desired configuration, such as square, round, or rectangular shaped or potato slice shaped. The dough piece, it is disclosed may be cut to provide a scalloped edge or periphery.

U.S. Patent Publications US 2002/0022076 A1 to Lanner at al., US 2002/0018837 A1 to Lanner et al., US 2002/0018838 to Zimmerman et al., US 2002/0034571 A1 Zimmerman et al., and US 2002/0028273 to Teras et al. disclose a process for making a bubbled snack chip. The chips are made from a dough composition comprising a pre-cooked, starch-based material (masa) and a pregelatinized starch. The pre-cooked, starch-based material has a pasting temperature from about 140° F. to about 209° F.; a peak viscosity of about 200 cP to about 1500 cP; a final viscosity of from about 500 cP to about 2200 cP; and a water absorption index of from about 2 to about 4. The pre-cooked, starch-based material has a particle size distribution in which about 0 to about 15 wt. %, preferably about 2 to about 15 wt. %, remain on a #16 U.S. sieve. The pre-cooked starch-based material may consist essentially of corn that has been cooked and steeped in a lime-water solution.

U.S. Pat. No. 6,004,612 to Andreski et al. discloses the production of shredded snacks with a chip-like appearance and texture. Thin, crisp, baked snacks having a chip-like appearance are continuously produced from a cooked, shredded laminate by substantially compressing the laminate without deleteriously affecting the attainment of a substantially uniform, visually apparent shred or woven pattern in the final, baked product. Additionally, at least substantially all, or all of the individual shred layers maintain their integrity and may be viewed in the final, baked product. The substantial compression is achieved by supporting the laminate of cooked, net-like sheets on a conveyer belt, and passing the supported laminate and belt between at least one pair of counterrotating compression rolls. The bottom, belt-supporting compression roll helps to maintain the linear speed of the separately driven conveyer belt as the top roll compresses the laminate against the top surface of the belt. Substantial movement or slippage of the laminate relative to the belt which would substantially disrupt or distort the shred pattern of the laminate is avoided. Air voids and inter-layer spacing are substantially reduced and interlayer adhesion is substantially increased by the compression so that upon baking the compressed laminate separation of the layers and puffing is substantially eliminated. The substantial compression of the laminate provides a thin, flat, chip-like appearance rather than a puffed or thick biscuit or cracker appearance. Upon completion of the compression, the thickness of the compressed laminate may range from about 0.035 inch to about 0.065 inch, preferably from about 0.055 inch to about 0.062 inch. The compressed laminate is preferably partially cut into triangular shaped pieces having flattened, blunted or rounded corners by a rotary cutter so that the apex or point of a triangle in one row does not touch or intersect the apex or point of another triangle located in an adjacent row.

U.S. Patent Application Publication No. US 2005/0053708 A1 to Mihalos et al discloses the production of thin, baked snacks having an irregular shape, scalloped edges, a chip-like crispy texture and bubbles distributed over their surfaces. A dough sheet for producing the thin, baked chips is obtained continuously by compressing a dough sheet to a thickness of less than or equal to about 0.035 inch between counterrotating gauge rolls while maintaining the surface of each gauge roll at a temperature of about 85° F. to about 95° F. Maintaining the gauge roll surface temperature at about 85° F. to about 95° F., it is disclosed, avoids sticking, tearing, and shredding of the thin dough sheet as it is compressed and transferred by the gauge rolls, even at high production rates or line speeds.

While scalloped edges provide an attractive, unique, distinctive appearance to snack chips such as those disclosed in U.S. Patent Application Publication No. US 2005/0053708 A1 to Mihalos et al, it has been found that in the high speed, mass production of snack chips from a fermented dough, scalloped edges tend to increase product breakage, the production of fines, and double and triple products. It is believed that the numerous, tight turns or very low radii of curvature of scallops tend to impede release of a fermented dough from a rotary cutter having irregularly shaped cutting elements. Tiny or micro tears in the dough in the concave portions of the scallops tend to propagate in the baked product causing "checking" or breakage of the baked pieces as well as breaking off of the scallops which disintegrate into fines.

Also, with fermented doughs it has been found that the scallops in an irregularly shaped dough piece tend to impede separation of the dough pieces from each other before and after baking thereby resulting in "doubles" or "triples". Even though the dough sheet is cut prior to baking, fusing of the dough pieces tends to occur before baking and during baking.

Before baking, the cut dough sheet is separated into rows which extend across the belt by transfer to a faster moving belt. After baking, the rows of baked product may be dropped past rods onto a lower belt and then tumbled to separate the pieces in each row from each other. When fermented doughs are employed, the presence of scallops in irregularly shaped fermented dough pieces which contain concave and convex edge portions tends to keep the dough pieces fused together thereby resulting in baked products which contain two or more snack chips fused together even after undergoing material handling operations.

In the present invention, notched edges are employed to facilitate separation of fermented dough pieces from each other before and after baking. The notches help to at least substantially avoid tearing and breaking of the dough pieces, and substantially prevent the production of fines and fused snacks such as "doubles" and "triples". The notches are distinctly visible in the baked snacks and provide a unique, attractive edge appearance to thin, baked snacks having an irregular shape which are produced from a fermented dough. The fermented snack products exhibit a chip-like crispy texture and have bubbles distributed over their surfaces. They may be produced from a fermented dough sheet which has been subjected to compression in final gauge rolls to a thickness of less than or equal to about 0.035 inch. The thin dough sheets may be produced continuously without tearing, shredding, or sticking at the final gauge rolls even at high production rates or line speeds. The irregularly shaped snack in a variety of shapes, can be produced from a single dough sheet by continuously cutting the thin dough sheet into pieces with a rotary cutter without producing dough scraps between the pieces. The very thin, irregularly shaped baked products provide an enhanced crispy, crunchy, chip-like texture and appearance rather than a cracker appearance and texture.

SUMMARY OF THE INVENTION

Thin, baked fermented chips having an irregular shape and surface bubbles are produced by cutting a fermented, wheat-based compressed dough sheet into a plurality of pieces having different shapes and notches with a single rotary cutter so that the dough pieces form an interlocking pattern and the notches extend around the periphery of each piece. The notches are spaced around the periphery of each piece and facilitate separation of the dough pieces from each other while at least substantially avoiding tearing and breaking of the dough pieces. In preferred embodiments at least substantially all of a plurality of notches of each piece are aligned or contiguous with notches of any adjacent piece in the interlocking pattern.

Each side or edge of each dough piece preferably has at least one concave portion and at least one convex portion and the notches of each dough piece are unevenly spaced from each other around the periphery of the dough piece to accommodate different radii of curvature of the concave portions and convex portions. In preferred embodiments at least substantially all of the concave portions have a plurality of notches and the peripheral sections between adjacent notches are also concave within each concave portion. The radius of curvature of peripheral concave sections between adjacent notches is sufficiently large so as to facilitate release of the dough from the cutter. In embodiments of the invention, the radius of curvature of at least substantially all peripheral concave sections between adjacent notches is at least about 0.1 inch.

The present invention also provides an apparatus for continuously producing thin, irregularly shaped, notch-edged fermented snacks in a variety of shapes from a single dough sheet without producing dough scraps between the pieces. The apparatus includes a rotary cutter having a plurality of cutting elements for cutting a dough sheet into a plurality of dough pieces arranged in rows in an interlocking pattern. The rotary cutter has a plurality of rows of cutting elements which extend circumferentially around the rotary cutter. Adjacent cutting elements within each row produce a differently shaped dough piece. Also, adjacent cutting elements within adjacent rows produce a differently shaped dough piece. One or more sides of each dough piece and baked product may each be convex or concave in shape. In preferred embodiments each of the cutting elements has an irregular shape, with each side or edge of each cutting element having at least one concave portion and at least one convex portion.

Each cutting element has a plurality of notch-forming blades spaced around and generally perpendicular or at angle to the periphery of each cutting element for cutting notches in each dough piece. In preferred embodiments, a plurality of the notch-forming blades of each dough piece-forming cutting element are aligned or contiguous with notch-forming blades of an adjacent dough piece-forming cutting element. Preferably, all or substantially all of the concave portions of the cutting elements have a plurality of blades for cutting notches, and the peripheral sections of the cutting elements between the notch-cutting blades within each concave portion are also concave. In preferred embodiments of the invention, the blades are unevenly spaced from each other around the periphery of each cutting element to accommodate different radii of curvature of the concave portions and the convex portions of the cutting elements. Preferably, the radius of curvature of at least substantially all peripheral concave sections between adjacent blades is at least about 0.1 inch to facilitate release of the dough from the rotary cutter and at least substantially avoid tearing and breaking of the dough pieces.

The baked fermented snack chips of the present invention include at least one flour, such as wheat flour, and a pregelatinized waxy maize starch. A pregelatinized waxy starch provides an extensible surface film prior to baking, which helps to temporarily trap moisture below the expandable film surface upon baking and promotes the production of surface bubbles. A pregelatinized potato starch, which is also activated (i.e. sufficiently hydrated) prior to baking, helps to reduce or control bubbling and to avoid a styrofoam-like texture. The fermented snack chips of the present invention are baked from a dough piece having a thickness of preferably less than or equal to about 0.035 inch. The very thin, irregularly shaped baked products provide an enhanced crispy, crunchy chip-like texture and appearance rather than a cracker appearance and texture. Even though the dough is very thin, the dough sheet may be cut to provide sufficiently large notches around the entire periphery of each dough piece so that the notches are distinctly, visibly apparent in the baked snack. The baked chips have surface bubbles comprising air pockets extending both above and below substantially unleavened, adjacent portions of the snack. Dockering or piercing of the dough prior to baking results in localized unleavened or thinned areas and does not prevent the attainment of a plurality of discrete bubbles. The pieces may also include blisters interspersed with the bubbles.

BRIEF DESCRIPTION OF THE DRAWINGS

The present invention is further illustrated by the accompanying drawings wherein.

DETAILED DESCRIPTION OF THE INVENTION

As shown in FIGS. 1-18, the thin, fermented baked snacks of the present invention made from a single dough sheet may have an irregular shape, each of which is different in FIGS. 1-18. Each differently shaped snack may include docker holes, and notched edges or sides around its entire periphery. For each of the different shapes, at least one of the edges or sides may be concave or convex in shape. In preferred embodiments of the invention, at least one, most preferably all sides of a snack have at least one convex portion and at least one concave portion. In embodiments of the invention, the snack chips may have five or more sides or edges, but generally four sides are preferred.

Figure 1:
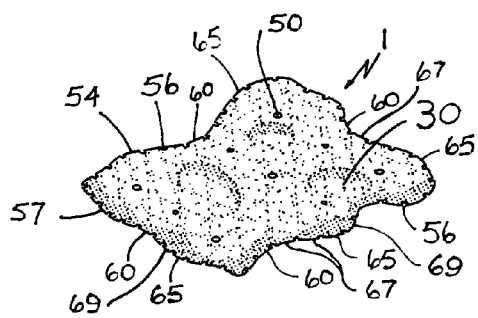
FIGS. 1 through 18 are top perspective views of eighteen differently shaped, irregular, notched snacks of the present invention which may be produced from a single, thin sheet of fermented dough in accordance with the present invention.
Figure 2:
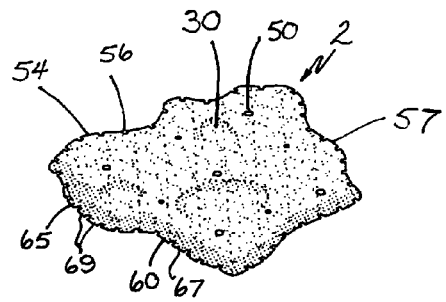
Figure 3:
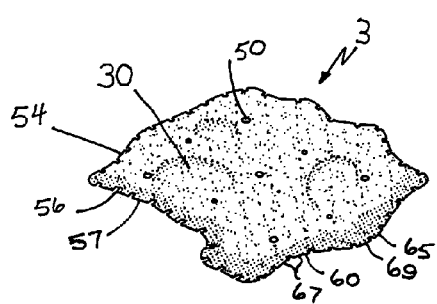
Figure 4:
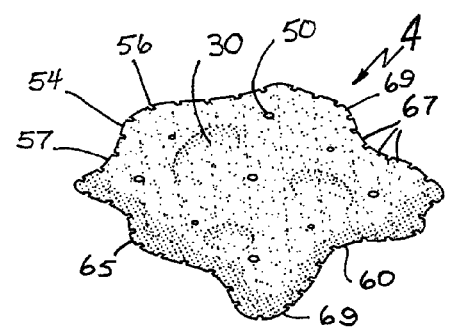
Figure 5:
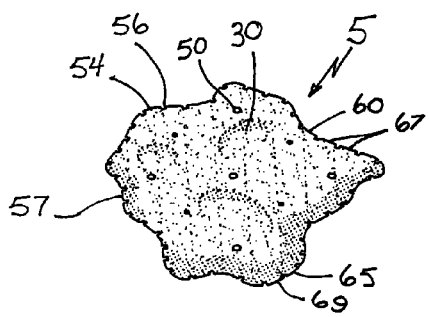
Figure 6:
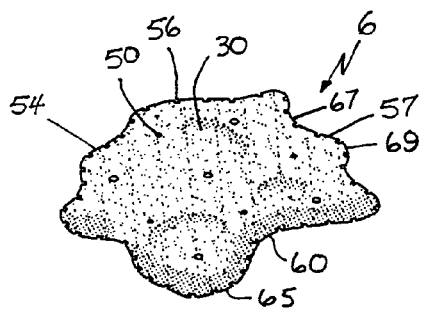
Figure 7:
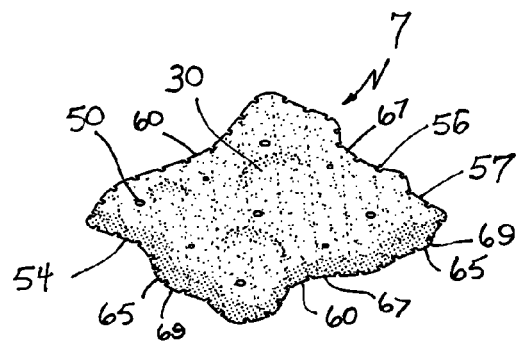
Figure 8:
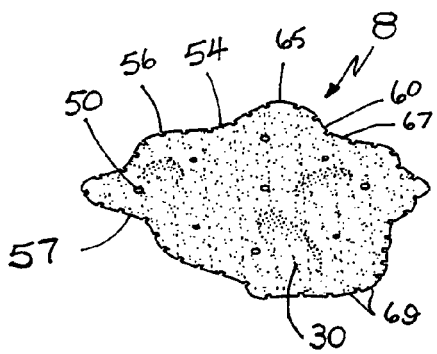
Figure 9:
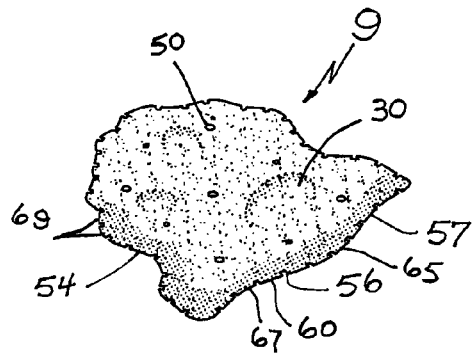
Figure 10:
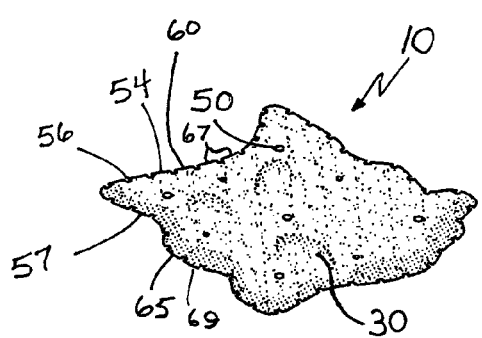
Figure 11:
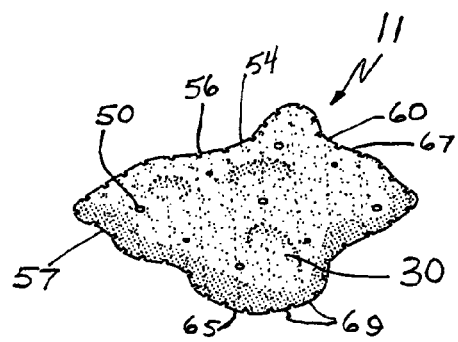
Figure 12:
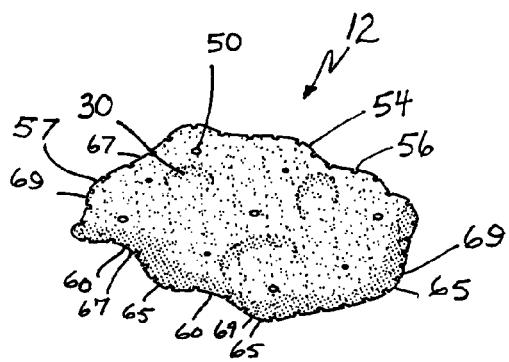
Figure 13:
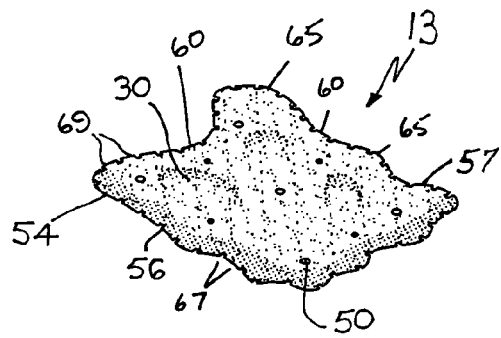
Figure 14:
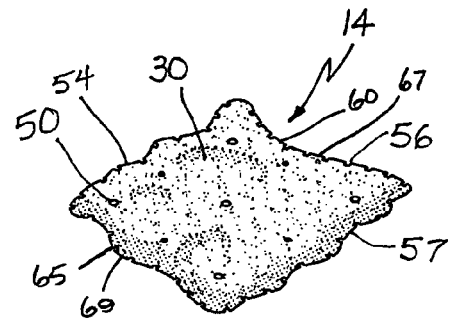
Figure 15:
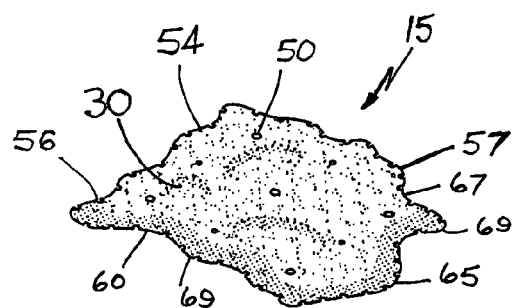
Figure 16:
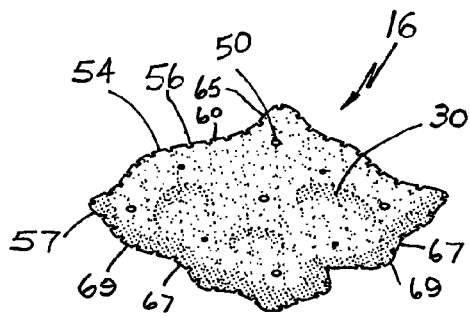
Figure 17:
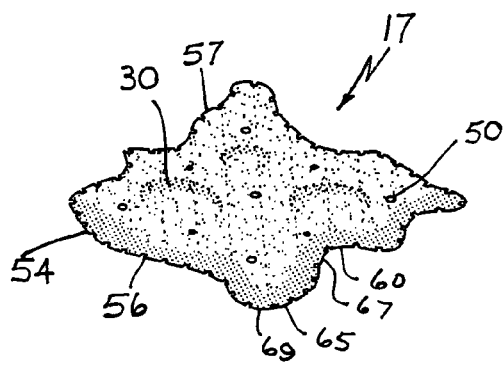
Figure 18:
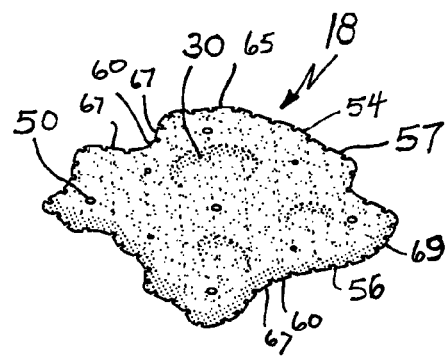
Figure 19:
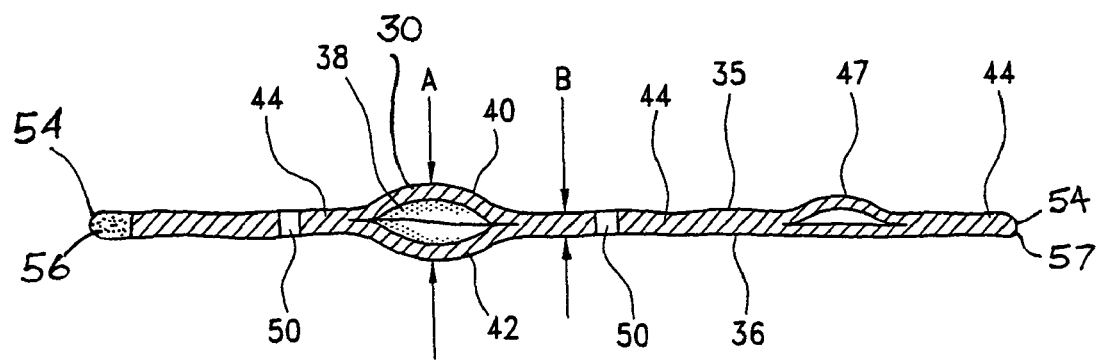
FIG. 19 is a cross-sectional view of a fermented snack product of the present invention showing a cross-section of a bubble, a blister, and a notch.

The baked snacks of the present invention include fermented reduced fat, low-fat, and no-fat baked products, as well as full-fatted fermented baked products. They may have the rich, full taste or flavor of a wheat-based fermented cracker, but the crispy, crunchy texture of a chip, rather than a leavened, mealy texture. As shown in FIGS. 1-19, the snack chips 1-18 have surface bubbles 30 distributed over their top and bottom surfaces 35, 36. As shown in FIG. 19, the bubbles 30 provide air pockets 38 within thinned, concave downwardly curved upper walls 40 and thinned, concave upwardly curved lower walls 42. The bubbles 30 and the air pockets 38 each extend a substantial distance both above and below adjacent, generally flat, crispy, substantially unleavened, thin areas 44 of the baked pieces 1-18, as shown in FIGS. 1-19.

The vertical dimensions of the bubbles 30 and of the air pockets 38 are substantially greater than the vertical dimensions of surrounding, adjacent, substantially flat areas 44 of the snack pieces 1-18. In embodiments of the invention, the ratio of the maximum vertical distance A between the upper surface and lower surface of at least two bubbles 30 per piece 1-18 to the maximum thickness B of the adjacent, generally flat, crispy, unbubbled and non-blistered areas 44 is at least about 2:1, preferably at least about 2.5:1, most preferably at least about 2.75:1. The pieces 1-18 may also include one or more blisters 47 interspersed with the bubbles 30, as shown in FIG. 19. The blisters 47 extend from only one surface, such as top surface 35, of the pieces 1-18, whereas the bubbles 30 extend from opposing surfaces 35 and 36 of the pieces 1-18.

In preferred embodiments, the snacks 1-18 are provided with a plurality of docker holes 50 to reduce checking and to help to avoid pillowing or the creation of an entirely puffed surface. In embodiments of the invention, the snacks may have a plurality of different sized docker holes that alternate on each snack to obtain a less cracker-like appearance than a snack with a plurality of larger docker holes. In preferred embodiments, each snack may have about nine docker holes. A plurality of discrete bubbles 30 may be obtained, even though the sheeted doughs of the present invention are dockered or pierced prior to baking.

The peripheral edge 54 of the snacks 1-18 include notches 56 which extend around the entire periphery 57 of the snack pieces, as shown in FIGS. 1-18. The notches 57 are spaced around the periphery 57 of each piece to facilitate separation of the dough pieces from each other while at least substantially avoiding tearing and breaking of the dough pieces. The notches 56 substantially prevent the production of fines and fused snacks such as "doubles" and "triples" by providing less resistance to breakage along a desired tear line, in the manner of a perforated tear line. In preferred embodiments at least substantially all of a plurality of notches of each dough piece are aligned or contiguous with notches of any adjacent piece in the interlocking pattern of the dough piece array produced in the dough sheet by the rotary cutter.

As shown in FIGS. 1-18, each side or edge of each dough piece preferably has at least one concave portion 60 and at least one convex portion 65 and the notches 56 of each dough piece are unevenly spaced from each other around the periphery 57 of the dough piece to accommodate different radii of curvature of the concave portions 60 and convex portions 65. Generally, it is preferable to increase the spacing between notches 56 in curved portions 60, 65 having low radii of curvature to reduce tearing.

In preferred embodiments at least substantially all of the concave portions 60 have a plurality of notches 56 and the peripheral sections 67 between adjacent notches 56 are also concave within each concave portion 60 to provide easier release of dough from the cutter and reduced dough tearing and fusion problems. Also, in preferred embodiments at least substantially all of the convex portions 65 have a plurality of notches 56 and the peripheral sections 69 between adjacent notches 56 are also convex within each convex portion 65. The radius of curvature of peripheral concave sections 67 and peripheral convex sections 69 between adjacent notches 56 is sufficiently large so as to facilitate release of the dough from the cutter and reduce tearing problems. In embodiments of the invention, the radius of curvature of at least substantially all peripheral concave sections 67 and peripheral convex sections 69 between adjacent notches is at least about 0.10 inch, preferably at least about 0.20. Generally, scallops have convex radii of curvature of about 0.06 in. to about 0.08 in. with no intervening concave sections around the entire periphery of the dough piece. These numerous, repetitive tight curves are believed to result in dough tearing and fusion problems encountered in the processing of fermented doughs.

The shape of the notches 56 may be square or rectangular as shown in FIGS. 1-18. These shapes are preferred over other shapes such as a V-shape or semi-circular shape because for a given notch opening width they provide a greater open or cut area which tends to reduce fusion and sticking problems. As exemplified in FIGS. 1-18, the notches 56 are distinctly visible in the baked snacks and provide a unique, attractive edge appearance.

Figure 20:
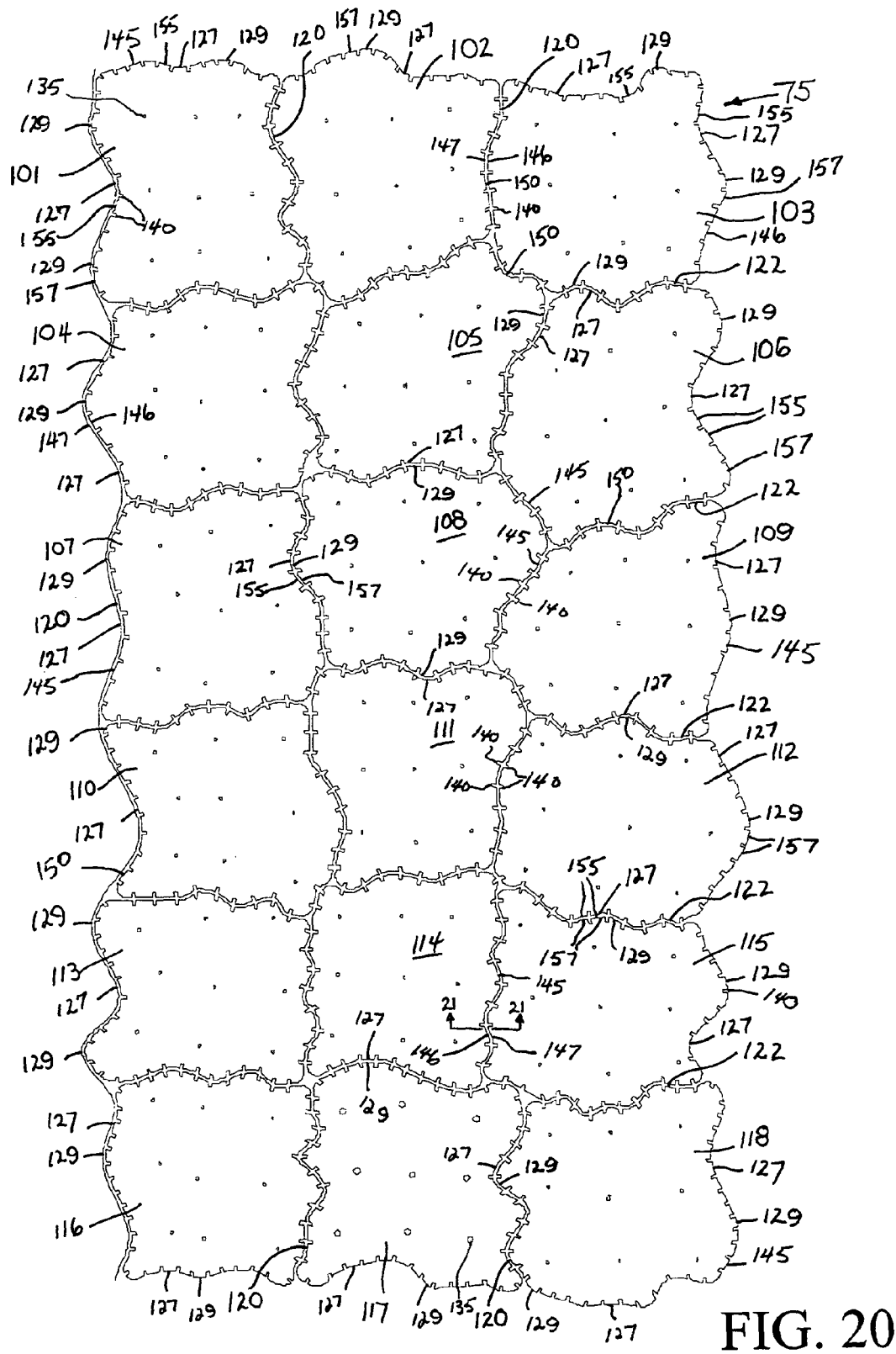
FIG. 20 shows a section of a rotary cutter design having cutting edges which may be used to produce the eighteen differently shaped snacks of FIGS. 1-18 from a single fermented dough sheet without producing interstitial dough scrap between adjacent dough pieces.

A rotary cutter 75 which may be used to produce the eighteen differently shaped, irregularly shaped, notch-edged snack chips 1-18 shown in FIGS. 1-18, respectively, is partially shown in FIG. 20. Dough pieces in an array which may be baked to obtain snack chips 1-18 of FIGS. 1-18, respectively, may be produced from cutting sections or elements 101-118, respectively shown in FIG. 20. The rotary cutter 75 has a plurality of rows of blunt-edged or rounded cutting elements 101-118 which extend circumferentially around the rotary cutter 75. Each adjacent cutting element 101-118 within each row produces a differently shaped dough piece. Also, adjacent cutting elements 101-118 within adjacent rows produce a differently shaped dough piece. The cutting elements 101-118 generally form continuous rows of lands or blunt cutting edges 120 which extend around the circumference of the rotary cutter 75 and interconnect with continuous rows of lands or blunt cutting edges 122 which extend along the length of the rotary cutter 75. The cutting elements and lands may be produced on the rotary cutter by known engraving techniques. The cutting elements 101-118 can cut a dough sheet into a plurality of dough pieces arranged in rows in an interlocking pattern with little or essential no production of scrap dough between the pieces.

One or more sides of each cutting element 101-118, and corresponding dough piece and baked product 1-18, may each be convex or concave in shape, or may each have a concave portion and a convex portion. Preferably at least one, most preferably all sides of each cutting element 101-118 have at least one concave portion 127 and at least one convex portion 129. Each cutting element may have four, five, or more edges or sides. Each cutting element 101-118 may contain a plurality of docker pins 135. In other embodiments, large and small docker pins may be provided in alternating arrangement for producing alternating large and small docker holes in each snack chip. The docker pins may be produced on the rotary cutter by known engraving techniques. In an alternative embodiment, the docker pins 135 may be eliminated from the rotary cutter 75, but employed on a separate dockering roll.

Figure 21:
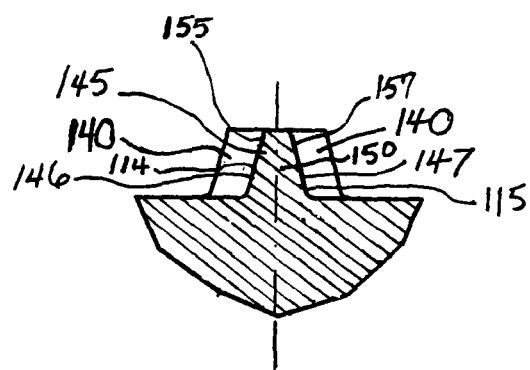
FIG. 21 shows an enlarged partial cross-section of a cutting element and notch-cutting blade taken along line 21-21 of FIG. 20.
Figure 22:
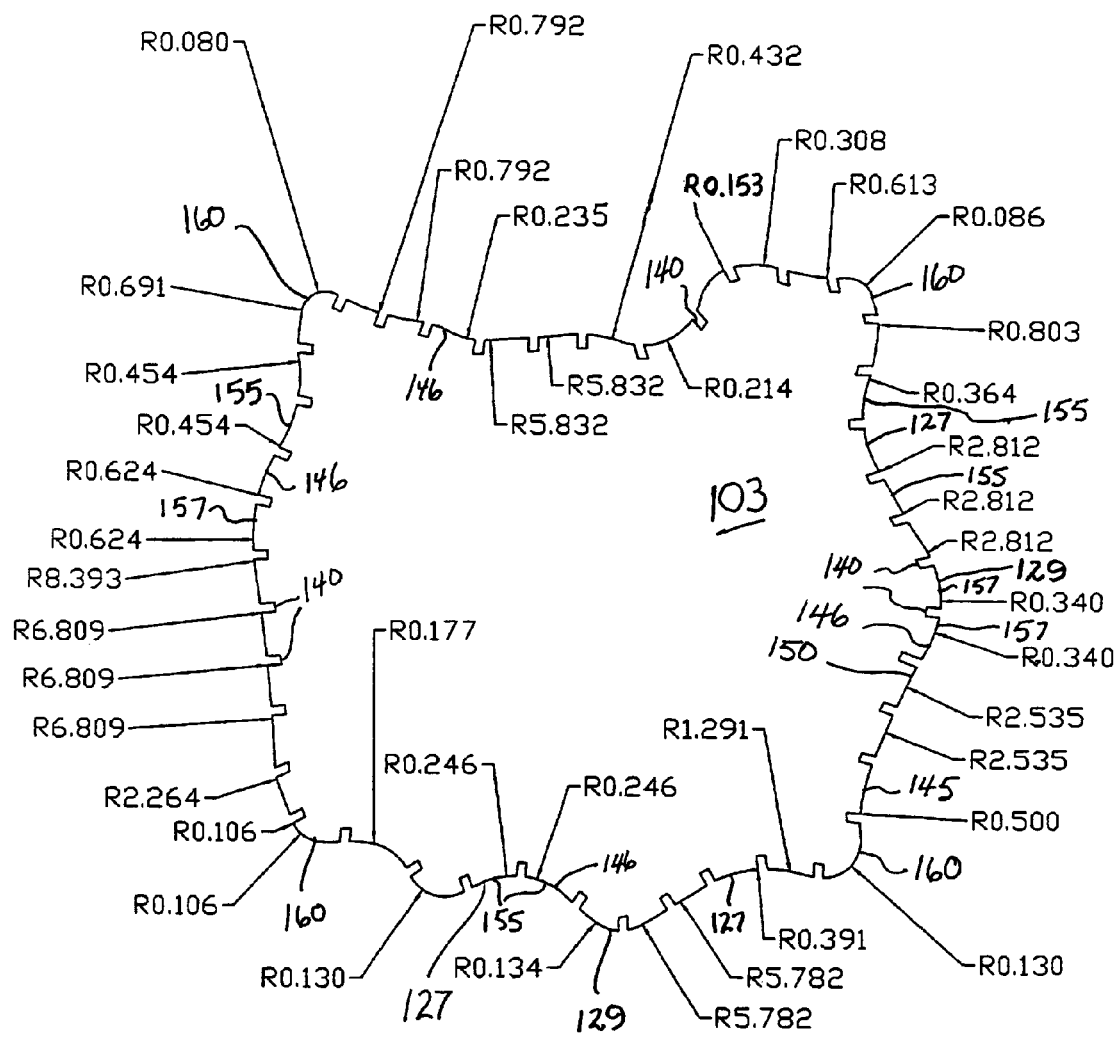
FIG. 22 is an enlarged partial view of a dough piece cutting element of FIG. 20 showing radii of curvature for the cutting element and a dough piece which cut from the element.

As shown in FIGS. 20, 21, and 22, each cutting element 101-118 has a plurality of notch-forming blades or lands 140 spaced around the periphery 145 and generally perpendicular or at a slight angle to the inner peripheral edge 146 and outer peripheral edge 147 of each cutting element 101-118 for cutting notches 56 in each dough piece. In preferred embodiments, a plurality of the notch-forming blades 140 of each dough piece-forming cutting element are aligned or contiguous with notch-forming blades 140 of an adjacent dough piece-forming cutting element. As shown in FIGS. 20 and 21, notch-forming blades 140 of adjacent dough piece forming cutting elements 101-118 may be integral with each other and with the peripheral cutting portions 150 of the dough piece-forming cutting elements 101-118. Also, as shown in FIGS. 20-22, the shape of the cutting edge of the notch-cutting blades 140 may be square or rectangular to provide a greater open or cut area in the dough for a given notch width to help reduce fusion and sticking problems.

Preferably, all or substantially all of the concave portions 127 of the cutting elements 101-118 have a plurality of blades 140 for cutting notches, and the peripheral concave sections 155 of the cutting elements 101-118 between adjacent notch-cutting blades 140 within each concave portion 127 are also concave as shown in FIGS. 20 and 22. Also, in preferred embodiments at least substantially all of the convex portions 129 of the cutting elements 101-118 have a plurality of blades 140 for cutting notches, and the peripheral convex sections 157 of the cutting elements 101-118 between adjacent notch-cutting blades 140 are also convex within each convex portion 129 as shown in FIGS. 20 and 22.

In preferred embodiments of the invention, as shown in FIGS. 20 and 22 the blades 140 are unevenly spaced from each other around the periphery 145 of each cutting element 101-118 to accommodate different radii of curvature of the concave portions 127 and the convex portions 129 of the cutting elements 101-118. Generally, as illustrated in FIG. 22, it is preferable to increase the spacing, or length of the peripheral concave and convex sections 155 and 157 between adjacent blades 140 in curved portions 127, 129 having low radii of curvature to reduce tearing. Also, increasing the spacing in portions having low radii of curvature facilitates machining or engraving of the rotary cutter.

As illustrated in FIG. 22, the radius of curvature of at least substantially all peripheral concave sections 155 between adjacent blades 140 is preferably at least about 0.10 inch, more preferably at least about 0.20 inch to facilitate release of the dough from the rotary cutter and at least substantially avoid tearing and breaking of the dough pieces. Also, as illustrated in FIG. 22, the radius of curvature of at least substantially all peripheral convex sections 157 between adjacent blades 140 is preferably at least about 0.10 inch, more preferably at least about 0.20 inch to facilitate release of the dough from the rotary cutter and at least substantially avoid tearing and breaking of the dough pieces. Generally, as shown in FIG. 22, the corners 160 of the cutting elements 101-118, are rounded or convex and the peripheral convex sections 129 at the corners 160 have the lowest radii of curvature, for example 0.10 or less, to avoid sharp corners and reduce scrap.

The blunt cutting elements 101-118 cut all the way through the dough and very slightly separate the pieces from each other so that the dough pieces do not rejoin or stick together after being cut. After being cut, the dough pieces may be separated in the downstream direction by transferring the dough pieces to a downstream conveyor which is operated at a slightly faster speed than the conveyer upon which the dough sheet is cut. The dough pieces produced by the rotary cutter 75 may preferably have at least substantially the same piece weight, so as to provide more even baking of each piece across the oven band.

Figure 23:
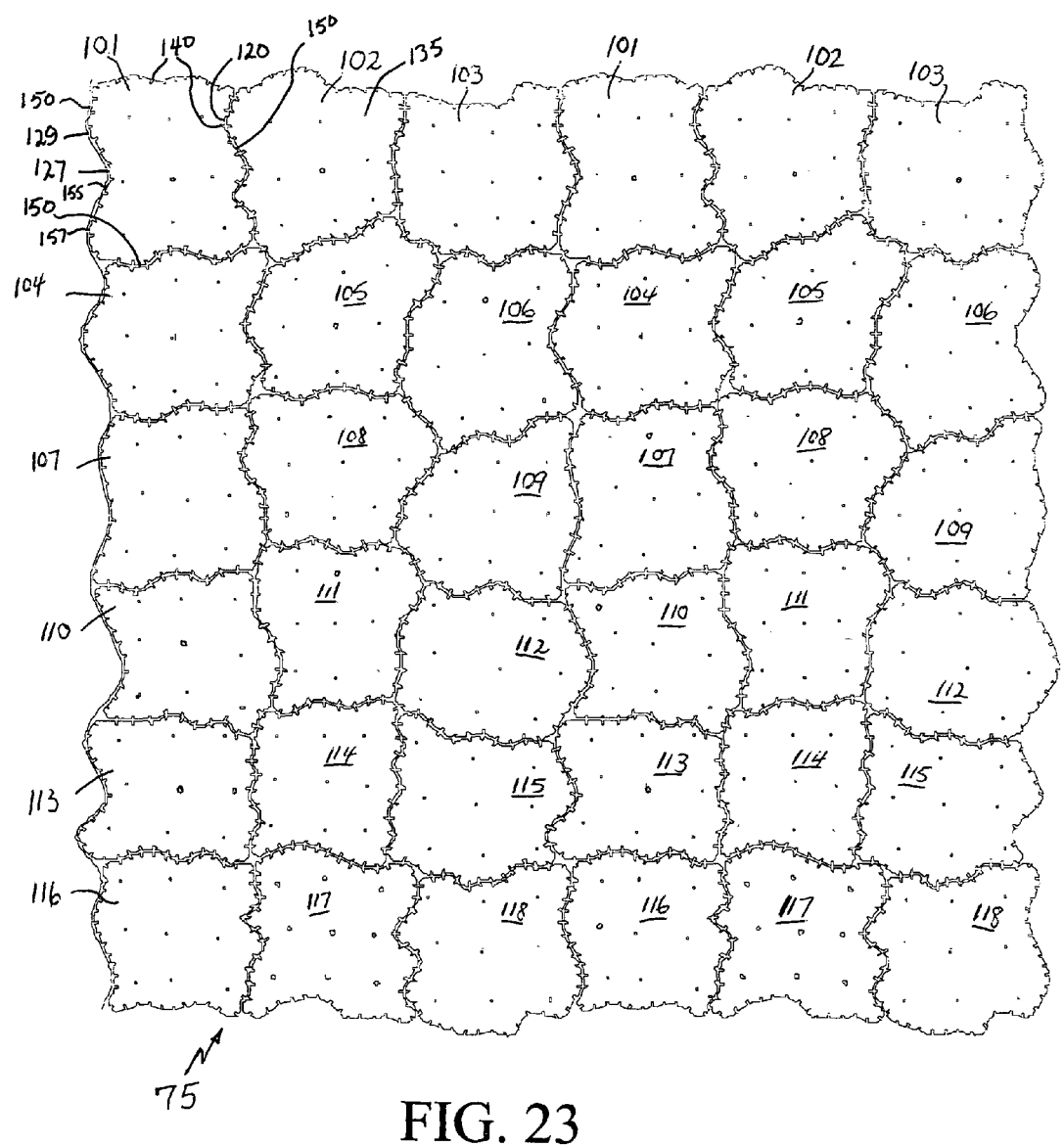
FIG. 23 shows a larger section of the rotary cutter design according to FIG. 20.

FIG. 23 shows a larger section of rotary cutter 75 according to FIG. 20 and the repeating cutting elements 101-118. As shown in FIG. 23, a dough piece shape may be repeated within a row every four to seven dough pieces according to the present invention. For example, a dough piece shape may be repeated in a longitudinal row every fourth dough piece and it may be repeated in a circumferential row every seventh dough piece to obtain a plurality of arrays of different cutting elements and corresponding dough pieces. The cutting elements are preferably shaped so as to provide rounded corners, and to avoid sharp edges to reduce breakage in the baked product during transport, packaging and subsequent shipping. Additionally, the cutting elements provide sufficiently large notches so that they are distinct and visible in the baked product.

Figure 24:
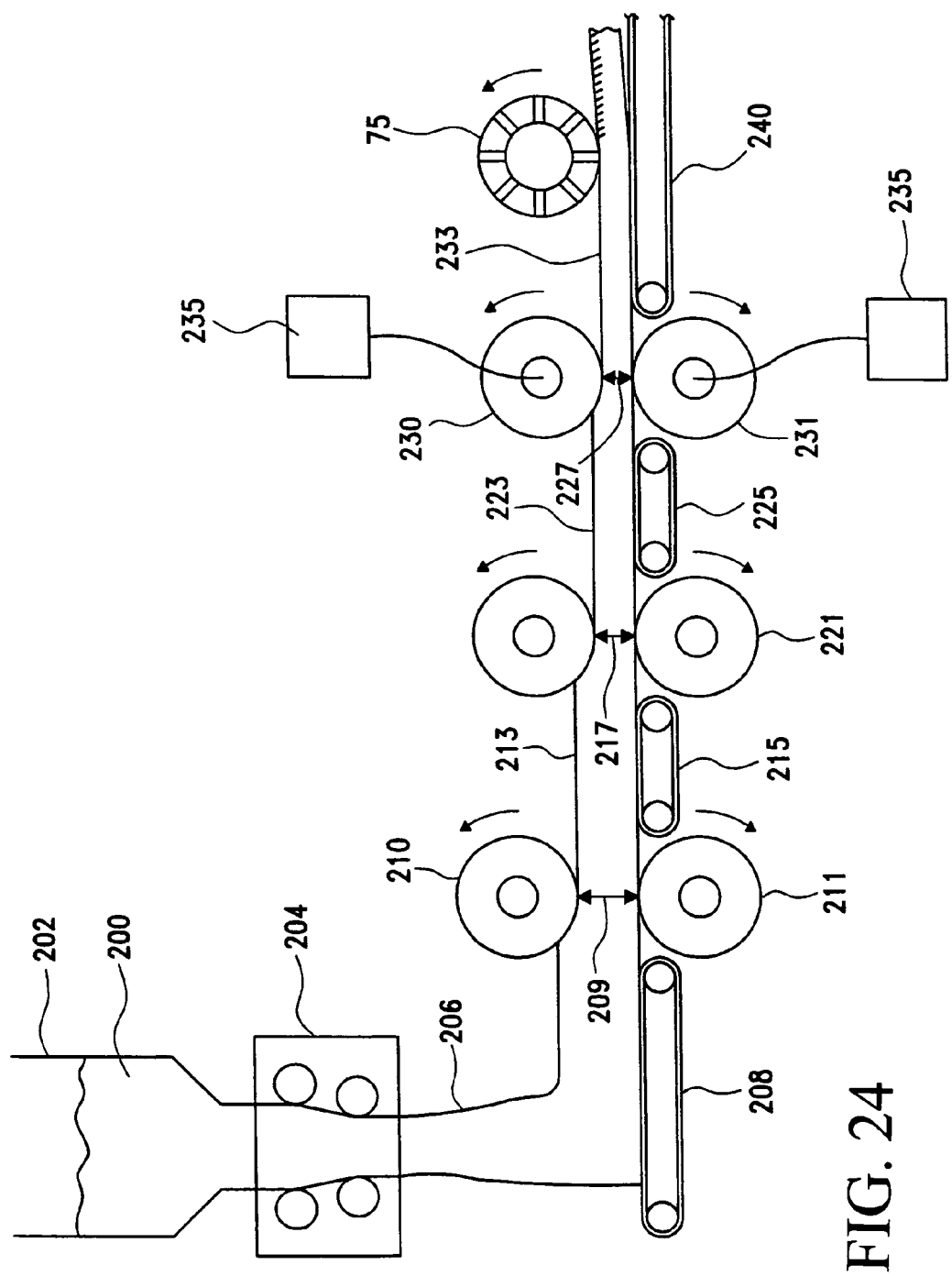
FIG. 24 is a schematic of apparatus that may be used in the production of the fermented baked snacks of FIGS. 1-18.

A schematic of apparatus conventionally used in the production of crackers which may be employed for the continuous production of the thin, baked snacks of the present invention is shown in FIG. 24. As shown in FIG. 24, a dough 200 from hopper 202 is sheeted in a conventional four roll dough sheeter 204 to obtain a dough sheet 206. Dough sheet 206 is conveyed by conveyor 208 to the nip 209 of a pair of counterrotating auxiliary gauge rolls 210, 211 and compressed into a sheet 213. Compressed sheet 213 is transported by a second conveyer 215 to the nip 217 of a second pair of counterrotating auxiliary gauge rolls 220, 221 and further compressed into a sheet 223. Compressed sheet 223 is transported by a third conveyer 225 to the nip 227 of a pair of jacketed counterrotating final gauge rolls 230, 231 and further compressed into a thin sheet 233. The final gauge rolls 230, 231 may be equipped with a conventional temperature monitoring and controlling device 235 for control of the gauge roll surface temperatures. The final gauge rolls are preferably non-tapered. Scrapers or knife-edges on the gauge rolls, particularly the final gauge rolls, should be maintained sharp, free of burrs or other imperfections, and pressure should be applied uniformly for proper release of the sheet from the roll. The thin sheet 233 may be transferred to a fourth, downstream conveyer 240 for cutting into individual pieces by rotary cutter 75. Rotary cutter 75 may be coated with a release/wear coating such as General Magnaplate Corporation's Tufram H-O coating.

The fermented doughs may be sheeted and compressed to form a thin dough sheet under the same compression and temperature conditions as disclosed in commonly assigned, copending U.S. application Ser. No. 10/371,547, for "Production of Thin, Irregular Chips With Scalloped Edges and Surface Bubbles," filed Feb. 21, 2003 in the name of Mihalos et al, and its corresponding U.S. Patent Application Publication No. US 2005/0053708 A1, the disclosures of which are herein incorporated by reference in their entireties. As disclosed therein, a dough sheet for producing thin, baked chips is obtained continuously by compressing a dough sheet to a thickness of less than or equal to about 0.035 inch between counter-rotating gauge rolls while maintaining the surface of each gauge roll at a temperature of about 85° F. to about 95° F. Maintaining the gauge roll surface temperature at about 85° F. to about 95° F. avoids sticking, tearing, and shredding of the thin dough sheet as it is compressed and transferred by the gauge rolls, even at high production rates or line speeds. The nip or gap between the counterrotating gauge rolls may be set to less than or equal to about 0.035 inch, preferably less than or equal to 0.030 inch, more preferably less than or equal to 0.025 inch, and most preferably less than or equal to 0.022 inch, for example from about 0.012 inch to 0.022 inch, while achieving high production rates without tearing of the dough sheet. Use of these very thin gaps provides a highly desirable thin appearance and crisp texture in the final baked product.

As disclosed in U.S. Patent Application Publication No. US 2005/0053708 A1 to continuously produce a wheat-based dough sheet using a final gauge roll gap of less than or equal to about 0.035 inches at high production rates or line rates, the surface of each of the gauge rolls is maintained at a temperature of about 85° F. to about 95° F. Generally, maintaining the surface of the gauge roll at a given temperature also maintains the dough sheet temperature within about 1° F. to about 3° F. of the gauge roll surface temperature. Use of a gauge roll surface temperature of about 85° F. to about 95° F. avoids sticking, tearing, or shredding of the dough sheet as it undergoes conveyance through and compression in the gauge rolls and assures the attainment of a consistent dough sheet thickness. Use of gauge roll surface temperatures outside of this range has been found to result in sticking of the dough sheet to the final gauge rolls which results in excessive tearing or shredding of the dough sheet with loss of production time and dough wastage. It is believed that as a dough sheet is reduced in thickness, not only does it tend to become more fragile, but also the film formed on its surface from film forming components such as a pregelatinized waxy starch exerts a greater influence on dough rheology, flexibility, water retention, and adhesiveness. Maintaining the gauge roll surface at a given temperature within the above range also maintains the dough sheet at a temperature which helps to provide or maintain proper dough viscosity, flexibility, strength, cohesiveness, moisture content, and reduced stickiness so as to achieve consistent release of the dough sheet from the gauge roll surface.

Production rates or line rates of from about 25 feet per minute (fpm) up to about 130 feet per minute (fpm), preferably from about 95 fpm to about 120 fpm may be achieved continuously without tearing or shredding of the dough. Rotary cutter speeds of from about 25 fpm to about 130 fpm, preferably from about 95 fpm to about 120 fpm may be employed.

Generally, as disclosed in U.S. Patent Application Publication No. US 2005/0053708 A1, when the dough is reduced in thickness by compression in the nip or gap between counterrotating gauge rolls, the compressed dough sheet may spring back or expand by up to about 35% of the original compressed dough sheet thickness or nip or gap setting. For example, when the final gauge roll gap or nip is set at 0.034 inch, 0.030 inch, 0.022 inch, or 0.017 inch the dough sheet is compressed to and has a thickness within the gap or nip of 0.034 inch, 0.030 inch, 0.022 inch, or 0.017 inch, respectively. However, upon or shortly after exiting the nip or gap, the dough sheet thickness may expand or increase to 0.042 inch, 0.037 inch, 0.029 inch, or 0.020 inch, respectively. In embodiments of the present invention dough sheet thicknesses up to about 0.040 inch after expansion from the final gauge roll nip of 0.030 inch may be employed and subjected to rotary cutting to obtain thin snack chips in accordance with the present invention. In preferred embodiments, the nip or gap of the final gauge roll is set at less than 0.025 inch, preferably less than or equal to 0.22 inch so as to obtain a dough sheet thickness after springback or expansion which is less than or equal to 0.030 inch. Thus, in preferred embodiments, the dough sheet which is subjected to rotary cutting has a consistent thickness across its width and length of less than 0.030 inch.

Generally, as disclosed in U.S. Patent Application Publication No. US 2005/0053708 A1, the greater the amount of compression of a dough entering the nip of the final gauge rolls, the greater is the amount of spring back or expansion after it leaves the nip. In preferred embodiments of the present invention, the dough sheet thickness is gradually reduced prior to entering the final gauge rolls using one or more pairs of counterrotating auxiliary gauge rolls or compression rolls. In embodiments of the invention, the dough sheet produced in the dough sheeter may be reduced in thickness by each set of auxiliary gauge rolls and by the final gauge rolls up to about 70%, generally at least about 10% of the thickness of the dough sheet entering the set of gauge rolls. For example, the dough sheet entering a first set of auxiliary rolls may have its thickness reduced by about 10% to 20%. Then the dough sheet entering a second set of auxiliary rolls may have its thickness reduced by about 45% to about 65%. The compressed dough sheet entering the final gauge rolls may then have its thickness reduced by about 35% to about 60%.

As disclosed in U.S. Patent Application Publication No. US 2005/0053708 A1, the auxiliary gauge roll and the rotary cutter may be operated under ambient conditions. The surface temperature of the auxiliary gauge rollers do not have to be adjusted or maintained to prevent sticking or tearing of the dough sheets passing through them. The temperature of the surface of the final gauge rolls may be controlled and maintained within the range of 85° F. to 95° F. by using a conventional fluid heat transfer medium such as water or food grade propylene glycol to internally either heat or cool the gauge rolls. Whether the gauge rolls are heated and/or cooled to maintain a desired temperature may depend upon ambient conditions, dough lay times, and line speeds or production rates. Generally, heating is employed at low production rates or line speeds and low ambient temperature conditions and long lay times. Cooling is generally employed at high production rates or line speeds, high ambient temperature conditions, and short lay times.

Conventional, commercially available jacketed final gauge rolls, and temperature monitoring and control equipment may be employed. Likewise, conventional, commercially available auxiliary gauge rolls or compression rolls may be utilized along with conventional three or four roll dough sheeters. A four roll dough sheeter is preferred. Conventional conveyors may be employed for feeding the dough sheets directly to the nip or gap of each pair of auxiliary rolls and the pair of final gauge rolls. Separate conveyers, downstream of each set of auxiliary rolls and downstream of the final gauge rolls may be employed to receive the compressed dough from the nip of each pair of rolls in conventional manner.

The thin fermented dough sheet from the final gauge rolls may be continuously cut using the notch-forming rotary cutter of the present invention to produce an array of dough pieces which are irregularly-shaped and notch-edged.

The fermented dough compositions, methods for making them, and baking and drying conditions which may be employed in the present invention may be the same as disclosed in U.S. Pat. Nos. 5,747,092 and 5,980,967 each to Carey et al., the disclosures of which are herein incorporated by reference in their entireties. The rotary cutter of the present invention may also be employed for the production of irregularly shaped, notched baked snacks from non-fermented doughs disclosed therein. For example, in embodiments of the invention, as disclosed in U.S. Pat. Nos. 5,747,092 and 5,980,967 each to Carey et al., fermented and non-fermented, baked wheat-based snacks may be produced by admixing:

(1) an uncooked wheat flour;
(2) a pregelatinized waxy starch in an amount of from about 3% by weight to about 20% by weight, preferably from about 5% by weight to about 15% by weight, based upon the weight of the wheat flour;
(3) a pregelatinized potato starch in an amount of from about 1.5% by weight to about 20% by weight, preferably from about 3% by weight to about 13% by weight, based upon the weight of the wheat flour;
(4) from 0% by weight to about 20% by weight, preferably from about 5% by weight to about 18% by weight, of an optional modified potato starch, based upon the weight of the wheat flour; and
(5) water to hydrate said starches and to form a machinable dough having a moisture content of preferably from about 23% by weight to about 38% by weight.

The total amount of the potato starches is preferably less than about 30% by weight, most preferably from about 8% by weight to about 25% by weight, based upon the weight of the wheat flour. In embodiments of the present invention, the weight ratio of the amount of the pregelatinized waxy starch to the total amount of the potato starches is from about 0.45:1 to about 1:1. Also, the ratio of the amount of pregelatinized waxy starch, such as pregelatinized waxy maize starch, to the total amount of the potato starches may be from about 1.5:1 to about 4:1. In embodiments of the invention, the snack chip may be made from a dough comprising about 30 wt. % to about 80 wt. % uncooked, or at least substantially non-gelatinized, non-pasted, wheat flour, based upon the weight of the dough. For example, the wheat flour employed is preferably ungelatinized, but in embodiments of the invention, wheat flours having a degree of gelatinization up to about 15% as measured by Differential Scanning Calorimetry (DSC) may be used.

Pregelatinized waxy starches or pregelatinized high amylopectin-content starches which may be used in the present invention include pregelatinized waxy maize starch, pregelatinized waxy rice starch, and mixtures thereof. The preferred pregelatinized waxy starch for achieving cohesiveness, dough extensibility, and dough machinability is a modified waxy maize starch such as Modified Corn Starch X-Pand'R F4-612 produced by A.E. Staley Manufacturing Company. The preferred pregelatinized waxy maize starch is not chemically modified nor acid hydrolyzed. The pregelatinized waxy starch preferably has a moisture content of less than or equal to about 6% by weight and a pH of about 5 to about 6. The Brabender neutral viscosity of the pregelatinized waxy starch may be at least 680BU at 25° C., with the time required to reach peak viscosity at 25° C. being a maximum of 20 minutes. The particle size distribution of the pregelatinized waxy starch may be less than or equal to about 20% by weight retained on a 50-mesh screen and less than or equal to about 30% passing through a 200-mesh screen. If the particle size is too small, the pregelatinized starch tends to hydrate predominately on the surface. Increasing the particle size of the pregelatinized waxy starch tends to increase its ability to form homogeneous dry blends with the pregelatinized potato starch and optional, modified potato starch and reduces its tendency to form lumps.

A preferred pregelatinized potato starch for use in the present invention is a di-starch phosphate of potato starch, which is cold-water-swelling, such as Paselli P, manufactured by Avebe America, Inc. It is crosslinked but not esterified. The pregelatinized potato starch preferably has a moisture content of from about 4% by weight to about 7% by weight, a sulfated ash content of 0.1% maximum, a pH in a 5.0% aqueous solution of about pH 6.0 to about pH 7.5, and a viscosity at 20° C. of about 9000 cps to about 13000 cps. The particle size distribution of the pregelatinized potato starch may be less than or equal to about 4% by weight retained on a 120-mesh screen.

A modified potato starch which may be used is Perfectamyl AC, manufactured by Avebe America, Inc. It is a raw, acetylated, but not crosslinked, potato starch. The modified potato starch may have a moisture content of about 170 to 190 mg/g, a pH of about 5.0 to about 7.0, and a sulfite content (as $SO_2$) of less than or equal to about 5 mg/kg. The particle size distribution of the modified potato starch may be less than or equal to about 8% by weight retained on a 120 U.S. mesh screen.

A pregelatinized potato starch which is unmodified, and not cross-linked, such as Paselli WA-4 may be employed. Paselli WA4 is an unmodified, non-crosslinked, pregelatinized potato starch that is cold water swelling. Paselli WA4 has a moisture content of about 8.75% by weight, a sulfated ash content of 0.8% maximum, and a pH in a 5% aqueous solution of about pH 6. The particle size distribution of Paselli WA4 may be less than or equal to 25% on a #45 screen. In such embodiments, an optional modified potato starch, such as Perfectamyl AC is not needed in the production of unfermented or fermented snacks and the total amount of potato starches may be reduced. For example, in embodiments where an unmodified, non-cross-linked pregelatinized potato starch such as Paselli WA-4 is employed, exemplary total amounts of potato starches may be from about 2 wt. % to about 7 wt. %, based upon the weight of the wheat flour. The use of the unmodified, non-cross-linked potato starch requires less water to be used in making the dough.

The fermented, wheat-based, bubbled snacks of the present invention are produced using a sponge stage and a dough-up stage. The basic ingredients in the preparation of a sponge are flour and water. The fermentation agents are yeast and bacteria. The yeast, flour, and the surfaces of the trough in which the sponge is formed can serve as sources of microflora. It is preferable to use a starter or inoculum from a previous batch of sponge to serve as a source of bacteria. A sponge flour is generally relatively strong, unbleached, with an ash content of 0.39 to 0.49%. It may have a protein content of about 7.5 to 13.0% (based on the weight of the flour, which is assumed to contain 14% moisture by weight) and an acid viscosity value in the range of about 60° to 90° M. A sponge may be produced by combining the flour, water, yeast, bacterial source, and flavoring ingredients, such as cheese, in a mixer, such as a spindle mixer or upright mixer.

It is preferable to add all of the water in the sponge-forming stage, to avoid an extra step in the dough-forming stage. However, a portion of the water may be added to the sponge in the dough-forming stage, in a manner which avoids disturbing the substantially uniform distribution of the leavening agents.

Exemplary relative amounts of the ingredients, which may be used in the formation of the sponge, are from about 50% by weight to about 70% by weight wheat flour, from about 25% by weight to about 35% by weight water, from about 1% by weight to about 15% by weight of flavoring ingredients, from about 0.05% by weight to about 1% by weight yeast, from about 0 to about 2% by weight diastatic malt or proteolytic enzyme, from about 0 to about 2% by weight yeast food, and from about 0 to about 2% by weight of starter or ferment. All percentages are based upon the total weight of the ingredients used to form the sponge. Known buffers can be added as needed to obtain a pH of about 5 to about 6.5 at the start of the fermentation.

Fermentation times (also referred to herein as sponge times) may be those conventionally used in the art to make fermented crackers. In the case of soda crackers or saltines, and the many variants of these products, such as oyster (soup) crackers, club crackers, cheese crackers, and the like, sponge times of about 2 to 24 hours are typically used. In preferred embodiments of the invention, sponge times which may be used are preferably from about 16 hours to about 21 hours, most preferably from about 18 hours to about 20 hours.

In preparing the sponge, no special order of mixing is required. Conventional processes can be used. Generally, the flour is dumped into a trough, a portion of the water containing dispersed yeast and buffer is added, the remaining ingredients of the sponge are added, and then the balance of the water is added. The sponge ingredients are mixed until substantial homogeneity is achieved.

When doughing-up the sponge, dough ingredients for mixing into the fermented sponge generally include flour and optional leavening or pH-adjusting agents and optional flavoring agents such as salt. The pregelatinized waxy starch, pregelatinized potato starch and optional modified potato starch are preferably added last.

In producing full-fat, reduced-fat or low-fat crackers, the shortening or fat may also be added in the dough-up stage. The addition of fat or shortening in the preparation of the sponge may decrease fermentation activity.

Minor amounts of water may be added in the dough-up stage. It is preferable to include all of the water as an ingredient of the sponge.

The dough-up wheat flour may be the same or different than the sponge wheat flour. For example, the dough-up wheat flour may be weaker than the sponge flour, and may have an ash content of about 0.43% to about 0.51% by weight, and an acid viscosity value of about 40° to 60° M.

The relative amounts of the sponge ingredients to the dough ingredients may generally be such that the weight-percent of flour used to form the sponge is from about 60% to about 75% by weight of the total amount of flour which is used.

Any emulsifiers used in the present invention are added in the dough-up stage, so as to ensure maximum fermentation. The liquid or "wet" emulsifiers, such as fluidized lecithin, are preferably added on the surface of the sponge, prior to flour addition. Keeping the "wet" ingredients in contact with the sponge minimizes lumping, as could otherwise occur if these ingredients were added on top of the flour in the dough-up stage. Dry ingredients such as salt, leavening agents, and the starch components may be added on top of the dough-up flour to avoid lumping. Any shortening or fat included in the formulation may be added last.

Hemicellulases may be added during sponge preparation, during sponge fermentation, or at a later time. However, adding the hemicellulase at dough-up is preferred, to avoid the possibility of interference with the sponge-fermentation process. For example, pentosanase is preferably added to the surface of the sponge, in a solution for even dispersion and avoidance of lumping, prior to flour addition. When, for example, pentosanases are used which work best at pH's of about 4.5 or 5, alkaline leavening agents, e.g. sodium bicarbonate, and alkaline calcium components preferably should be maintained separate from the pentosanases for as long as possible, to obtain consistently optimal results.

The dough-up ingredients and the sponge are then mixed to obtain a dough of substantial homogeneity. After mixing, the dough is proofed, or allowed to ferment further, as is conventional in the cracker art. The viscosity of the dough is also decreasing during this time. Generally, proofing times may range from about 2 hours to about 5 hours, preferably about 2.5 hours to about 3.5 hours, most preferably about three hours. Generally, the temperature of the sponge before doughing, the temperature of the dough after doughing, and the temperature of the dough at the dough-forming machine may be substantially the same. Somewhat higher temperatures may be used in the dough-up, particularly towards the end of the dough-up proofing time, than used before doughing-up. The higher temperatures may be used to assist in hydration of the starches, provided they do not substantially interfere with the action of the bacteria and yeast and do not create an excessively sticky dough.

The proofed dough may then be machined and baked to obtain wheat-based snack chips, having surface bubbles and a crispy, crunchy texture, in accordance with the present invention.

The following example, wherein all parts, percentages, and ratios are by weight, and all temperatures are in ° F. unless indicated to the contrary, illustrate the present invention:

EXAMPLE

The ingredients and their relative amounts, which may be used to produce a cohesive, machinable dough for producing a fermented, wheat-based snack having notches, a plurality of surface bubbles, a crispy, crunchy, chip-like texture and a fermented, cheese cracker flavor, are:

| Sponge Ingredients | Parts by Weight |
|---|---|
| Wheat flour, medium (about 13% by weight water) | 64.00 |
| Cheddar cheese (about 36% by weight water) | 8.00 |
| Flavoring and spices | 0.80 |
| Starter solution (protease, yeast and previous batch starter admixed with water) | 2.07 |
| Low Trans Oil | 1.22 |
| Water | 31.44 |
| TOTAL | 107.53 |

The sponge may be formed at atmospheric pressure and room temperature by adding the cheddar cheese into an upright mixer and mixing it at high speed to break it up. The starter solution, flavoring and spices may then be added to the mixer. The oil and water may then be added, followed by addition of the sponge flour. The ingredients may be blended to obtain a substantially homogeneous mixture. The blended mixture may then be fermented or proofed for 18 to 20 hours at about 70° F. to about 80° F.

Following this 18-20 hour fermentation, dough-up of the sponge may be effected with the following dough-up ingredients:

| Dough-Up Ingredients | Parts by Weight |
| --- | --- |
| Wheat flour, medium (about 13% by weight water) | 36.00 |
| Pregelatinized waxy maize starch | 5.55 |
| Pregelatinized potato starch | 12.22 |
| Minor ingredients (monosodium glutamate, autolyzed yeast extract, salt) | 2.34 |
| Sodium bicarbonate | 0.75 |
| TOTAL | 56.86 |

The pregelatinized waxy maize starch may be Modified Corn Starch X-Pand'R F4-612, which is a pregelatinized waxy maize starch produced by A.E. Staley Manufacturing Company. It has a moisture content of less than or equal to about 6% by weight and a pH of about 5.5 (+/−0.5). The particle size distribution of the X-Pand'R is about 20% maximum retained on a 50-mesh screen and about 30% maximum passing through a 200-mesh screen.

The pregelatinized potato starch may be Paselli P produced by Avebe America, Inc. The Paselli P is a pregelatinized potato starch which is a di-starch phosphate of potato starch, which is cold-water swelling. The Paselli P pregelatinized potato starch has a moisture content of about 5.5% by weight, a sulfated ash content of 0.1% maximum, a pH in a 5.0% aqueous solution of about pH 6.75, and a viscosity at 20° C. of about 11000 cps±2000 cps. The particle size distribution of the pregelatinized potato starch may be less than or equal to about 4% by weight retained on a 120-mesh screen.

The dough-up flour may be dumped on top of the sponge, followed by addition of the sodium bicarbonate, salt, monosodium glutamate, autolyzed yeast extract, X-Pand'R pregelatinized waxy maize starch, and Paselli P pregelatinized potato starch on top of the dough-up flour. The ingredients may be mixed at atmospheric pressure and room temperature to obtain a substantially homogeneous dough having a temperature of about 86° F. to about 96° F. The dough may then be proofed for about 0.5 to 3 hours to uniformly and substantially hydrate the pregelatinized waxy maize starch and the pregelatinized potato starch and to develop a gelatinous film. On a calculated basis, the dough moisture content may be about 28% by weight to about 33% by weight.

The proofed dough may then be transferred to a sheeter and formed into a sheet. Once the sheet is formed, it may be reduced in thickness in gradual stages by at least two sets of non-tapered reduction rolls. Equipment for the application of conditioned air may be available to reduce sticking of the dough sheet to the surface of the rolls.

The dough sheet may be passed through the final gauge rolls and sheeted. To allow for proper release of the sheet, the final gauge roll surface temperature may be maintained and controlled between about 87-95° F. by, for example, an internally circulating liquid such as water. The final gauge rolls may have a gap of 0.034 inches to obtain an average dough sheet thickness of 0.0345 inch (0.030 inch minimum and 0.042 inch maximum). The chilled water temperature for the final gauge rollers may be about 40° F. to about 42° F. The temperature of the dough just before the final gauge rollers may be about 88° F. The temperature of the dough after the final gauge rollers may be about 85° F.

The sheeted and compressed dough may then be fed to a rotary cutter apron having the cutting elements as shown in FIGS. 20-23 to form differently-shaped, irregular dough pieces having notches. The residence time between the final gauge roll and the cutter apron may be approximately 1.7 seconds at production speeds. The cutter may have a speed of about 12 rpm or greater and the corresponding line speeds may be up to about 130 feet/minute. The dough pieces may be baked to a moisture content of from about 1% by weight to about 3.75% by weight to obtain notched, fermented snack chips as shown in FIGS. 1-18.

What is claimed is:

1. A method for producing thin, baked fermented chips having an irregular shape and surface bubbles, comprising:
    a) forming a fermented dough comprising about 30% by weight to about 80% by weight of an uncooked wheat flour based upon the weight of the dough into a dough sheet,
    b) reducing the thickness of the dough sheet using a pair of counter rotating gauge rolls,
    c) cutting the dough sheet into a plurality of pieces having different shapes and notches with a single rotary cutter so that the dough pieces form an interlocking pattern and the notches extend around the periphery of each piece, wherein each side or edge of each dough piece has at least one concave portion and at least one convex portion interlocking with an adjacent dough piece, at least substantially all of said concave portions have a plurality of notches and peripheral sections between adjacent notches, each peripheral section within each concave portion also being concave, and the notches are spaced around the periphery of each piece to facilitate separation of the dough pieces from each other, wherein at least substantially all of a plurality of notches of each piece are aligned or contiguous with notches of any adjacent piece, and
    d) separating the dough pieces from each other.

2. A method as claimed in claim 1 wherein the notches of each dough piece are unevenly spaced from each other around the periphery of the dough piece to accommodate different radii of curvature of said at least one concave portion and said at least one convex portion.

3. A method as claimed in claim 1 wherein the radius of curvature of peripheral concave sections between adjacent notches is sufficiently large so as to facilitate release of the dough from the cutter.

4. A method as claimed in claim 1 wherein the radius of curvature of at least substantially all peripheral concave sections between adjacent notches is at least about 0.1 inch.

5. A method as claimed in claim 1 wherein the notches are rectangular or square in shape.

6. A method as claimed in claim 1 wherein said dough comprises:
    about 30% by weight to about 80% by weight of an uncooked wheat flour, based upon the weight of the dough,
    about 3% by weight to about 20% by weight of a pregelatinized waxy maize starch, based upon the weight of the wheat flour, and
    at least one potato starch.

7. A method as claimed in claim 6, wherein said dough sheet is cut all the way through with a blunt cutting edge to obtain said dough pieces, said dough pieces are spaced from each other by transferring the pieces from one conveyor to a faster moving conveyer, the weight of each of said dough pieces is at least substantially the same, and the dough pieces are baked to produce a plurality of surface bubbles in the baked pieces.

8. A method as claimed in claim 1 wherein at least substantially all of said convex portions have a plurality of notches and peripheral sections between adjacent notches, each peripheral section within each convex portion also being convex.

* * * * *